United States Patent [19]
Stolzer et al.

[11] Patent Number: 5,115,599
[45] Date of Patent: May 26, 1992

[54] APPARATUS FOR REMOVAL OF WORKPIECE ELEMENTS, PARTICULARLY BOLT, ROD OR DISK-SHAPED ELEMENTS, FROM A CUTTING APPARATUS

[75] Inventors: Armin Stolzer, Renchen; Rainer Huck, Baden-Baden-Neuweier, both of Fed. Rep. of Germany

[73] Assignee: KEURO Maschinenbau GmbH & Co. KG, Achern-Gamsburst, Fed. Rep. of Germany

[21] Appl. No.: 550,851

[22] Filed: Jul. 10, 1990

[30] Foreign Application Priority Data

Aug. 26, 1989 [DE] Fed. Rep. of Germany ....... 3928328

[51] Int. Cl.⁵ .............................................. B26D 7/06
[52] U.S. Cl. ........................... 51/215 CP; 51/215 UE; 51/112; 83/159; 83/411.4; 414/226; 414/745.7
[58] Field of Search ......... 51/215 R, 215 CD, 215 H, 51/215 UE, 703 WH, 165.76, 165.77, 165, 19, 1, 112, 113; 83/159 X, 411.4 X, 154, 119, 410.8, 720; 414/224, 226, 745.7

[56] References Cited

U.S. PATENT DOCUMENTS

| | | | |
|---|---|---|---|
| 1,813,340 | 7/1931 | Conti | 83/154 |
| 3,125,172 | 3/1964 | Tilden | 51/215 R |
| 3,292,310 | 12/1966 | Lefevre | 51/215 R |
| 3,478,632 | 11/1969 | Schmermund | 83/159 |
| 3,601,927 | 8/1971 | Kikuchi | |
| 3,795,324 | 3/1974 | Kiwalle | |
| 4,006,829 | 2/1977 | Tokunaga | 414/226 |
| 4,252,040 | 2/1981 | Kiefer | |
| 4,739,872 | 4/1988 | Roberts et al. | 414/224 |

FOREIGN PATENT DOCUMENTS

| | | |
|---|---|---|
| 1954487 | 9/1970 | Fed. Rep. of Germany |
| 2342645 | 3/1974 | Fed. Rep. of Germany |
| 2816497 | 10/1979 | Fed. Rep. of Germany |

*Primary Examiner*—Bruce M. Kisliuk
*Assistant Examiner*—Eileen P. Morgan
*Attorney, Agent, or Firm*—Frishauf, Holtz, Goodman & Woodward

[57] ABSTRACT

A unitary workpiece handling system has a frame (10) which can be operatively coupled to a supply conveyor (1, 4, 5, 6) which transports workpieces to a supply position. Two transfer jaws (17, 18) engage and guide and may grip the workpiece at end faces and, by pivotable mounting and upon pivoting about a pivot axis (20), transfer the workpiece to a receiver (22, 23) which is formed by receiver elements having upstanding portions to define an essentially prismatic configuration therebetween. The receiver is pivotable about a receiver axis (21) to transfer the workpieces to a workpiece gripping system (25) which picks up the workpiece at the end faces and places it on a delivery conveyor (26) or the like, directly or after rotating the workpieces by 90°, so that upstanding disk-like elements are laid flat. A plurality of workpieces can be, individually, in the transfer jaws (17, 18), the receiver (22, 23) and the gripper (25) to provide for rapid handling. A burr removal brush (32) can be in the path of pivoting movement of the receiver.

22 Claims, 15 Drawing Sheets

APPARATUS FOR REMOVAL OF WORKPIECE ELEMENTS, PARTICULARLY BOLT, ROD OR DISK-SHAPED ELEMENTS, FROM A CUTTING APPARATUS

Reference to related patents and patent application, the disclosures of which are hereby incorporated by reference:

U.S. Pat. No. 4,252,040, Kiefer, to which German Patent 28 16 497 corresponds, assigned to the assignee of the present application. U.S. Ser. No. 07/558,148 filed Jul. 25, 1990, Stolzer.

U.S. Pat. No. 3,601,927, Kikuchi et al, to which German Patent 19 54 487 corresponds.

U.S. Pat. No. 3,795,324, Kiwalle, to which German Patent 23 42 645 corresponds.

FIELD OF THE INVENTION

The present invention relates to apparatus particularly adapted for association with a cutting apparatus of rod, rail or bar-shaped material, and to remove workpieces or cut elements from such a cutting or severing apparatus, and more particularly to reliably grip the cut elements for selective transfer to other apparatus or devices in predetermined aligned positions, for example for gripping by machine tools and the like for subsequent working on the workpiece elements, or, selectively, for placement into receptacles, bins or the like.

Various types of severing machines to cut elongated material into workpiece elements are known. If the severing machines make miter cuts, selectively, for example after having made a 90° cross cut, cut elements will result which are wedge-shaped and may be considered scrap. These, also, must be removed from the cutting or severing machine. The cutting or severing machine, for example, may be a cold circular saw, a band saw, a power hack saw or the like; removal apparatus is also at times associated with shears, especially cold cutting shears or the like. The stock material from which the cut elements are made may have any desired shape, for example may be circular, polygonal, tubular, channel or I-beam shaped or of any other cross-sectional configuration.

Severing or cutting machines which cut off workpieces of predetermined length require removal of the workpieces. The removal can be merely by a transport belt or conveyor, for example a roller conveyor. For many applications, however, it is desirable that the removal path include a holding structure to hold the cut elements or workpieces so that they will be placed in a predetermined position for subsequent gripping or handling by automatic machine tools.

Usually, when severing a rail or rod stock element to form elongated workpieces, the resulting workpiece elements are, themselves, rail or rod-shaped; they may, however, have undulating shape or have only disk shape, that is, have been cut into narrow slices from a starting stock rail or rod. The cut elements may differ from each other, particularly in size. Modern computer or numerically controlled severing or cutting machines can make cut elements, as desired, in many individually differing lengths since the adjustment of the machines to cut specific sizes can be carried out effectively automatically. It is no longer required to make large quantities of any one size. Likewise, interchange of stock material at the cutting machine can be automated. Thus, the cutting or severing machine may supply workpieces in highly variable quantities and shapes. It is, thus, a requirement that a handling apparatus, coupled to receive the cut elements from the severing or cutting machine is equally flexible regarding further handling of the cut elements. The cut elements also should be supplied to a subsequent transport system, gripper system or conveyor system not necessarily in the alignment and position as derived from the cutting machine; the further handling apparatus should be capable to transfer cut workpieces, especially disk-shaped short cut-off pieces, in upstanding form, as well as in flat form, that is, rotated 90° with respect to the cutting or severing surface for further handling and working on the workpiece elements.

Automatic handling of cut elements raises problems. Especially, the nature of the cut elements should be so improved that subsequent automatic clamping apparatus or other handling apparatus of subsequent machine tools which may act on the cut elements or workpieces do not cause problems with respect to orientation or presentation of the workpiece elements to such subsequent machine tools. Additionally, severing or cutting machines operating on metallic or wooden stack, in operation, frequently leave burrs or splinters on the workpiece elements. These burrs or splinters should be removed from the cut elements. It is desirable that such removal of burrs and other similar imperfections arising due to the cutting process be removed from the cut elements before they are further machined.

In general, thus, there is a need to provide a handling apparatus for individual cut elements, particularly derived from a cutting or severing machine, which permits subsequent machining of the cut elements in automatic machine tools, including presentation of the cut elements to the subsequent automatic machine tool.

THE INVENTION

It is an object to provide a mechanical interface apparatus capable of removing essentially stiff or rigid workpieces derived, for example, from a cutting or severing machine, and transferring the workpieces to subsequent elements for later handling and working on the workpieces. Such final work may be turning in a lathe, milling or the like, which requires the workpieces to be received in a suitable manner and/or position. The apparatus should, further, be simple, reliable and compatible with existing cutting or severing machines and adapted for operative association with material handling or gripping apparatus customary in the machine tool industry.

Briefly, two operatively associated transfer jaws are pivotably located to pivot about an axis which is essentially parallel to the workpiece axis, and transfer a workpiece element to a workpiece receiver. The transfer jaws grip the workpiece at the end face or brake or guide delivery movement of the workpiece transversely to its axial extent. The workpiece receiver has elements with jaw-like configuration having a pair or projecting portions and convering bottom walls, to form an essentially prismatic configuration, somewhat similar to an open-end wrench, to engage the stem portion of the workpiece and position the workpiece element at the depressed apex of the prismatic receiver elements. The workpiece receiver and the transfer jaws have overlapping pivoting or tilting ranges, so that workpieces can be transferred directly from the transfer jaws to the workpiece receiver, and released upon opening of the transfer jaws. Workpiece grippers then are provided movably retained on the apparatus, for example on a frame thereof, for movement essentially parallel to the workpiece axis and additionally movable between a gripping position for gripping the workpiece on the workpiece receiver and moving the workpiece to a delivery position, for release of the workpiece at the delivery position.

In accordance with a preferred feature of the invention, the workpiece grippers are additionally rotatable, so that the alignment and position of the workpiece element, after pick-up from the receiver, can be changed to deliver the workpiece in a predetermined orientation to a subsequent apparatus, a removal conveyor or the like.

The system has the advantage that a severing or cutting machine which delivers cut elements can be so further transported that, after handling by the material handling system of the present invention, the workpieces will be available for further machining or working thereon in a predetermined "ready" position and orientation. This availability of the workpieces is independent on the type of conveyor or delivery apparatus used in combination with the cutting or severing machine. Of course, the system can also deliver the workpieces in a continuous transport or for further handling by en-the-run or in-the-fly transfer.

Delivering a workpiece element in a precisely defined delivery position permits secure gripping and handling for subsequent operations on the workpiece. The piece gripping means are so arranged that they grip the workpiece at the forward and rearward sides, looked at from the cutting direction of the workpiece.

In accordance with a feature of the invention, burrs and other imperfections on the workpiece arising due to the cutting operation can be removed as the workpiece element is handled within the system of the present invention, for example upon transfer between the workpiece receiver to the grippers. The pivoting path of the workpiece receiver may carry the workpiece past an abrasive disk, grinding wheel, steel brush or the like, to remove burrs and cutting imperfections.

The structure and system of the present application has the additional advantage that it is capable of handling workpieces of widely varying diameters. Workpieces of larger diameter are gripped at outer positions, that is, eccentrically with respect to the cross section of the workpiece material, and close to a predetermined delivery position; smaller workpieces can be gripped essentially diametrically. The transfer jaws are so arranged that they can grip any type of workpiece, up to a predetermined design size, without deforming any burrs which may have arisen in severing or cutting the workpiece. Larger elements are gripped laterally adjacent any possible burr, and the transfer jaws can be formed with small recesses to permit gripping even smaller workpieces clear of any burr.

The system in accordance with the present invention, and providing an additional advantage, is based on dividing various handling operations and paths into separate steps, each one of which can operate very fast and hence with short cycling time. Modern cutting machines or severing saws and the like have a very high cycling time and also rapidly permit change of stock or raw material which is being cut. This, then, will result in rapid changes in the nature of the workpieces to be handled by the system of the present invention. The system, thus, has been subdivided with respect to different handling steps so that it can keep pace with the rapid operating cycle of the cutting machine. The transfer jaws rapidly pick up the material from the cutting machine for transfer to the receiver, and as soon as released on the receiver are ready to pick up another workpiece. Thus, it is not necessary to wait until the workpiece placed on the receiver has been picked up by the workpiece grippers for subsequent transfer and alignment in the desired delivery position. Rather, the respective handling steps are broken up, so that each one can operate fast with rapid cycling time.

DRAWINGS

DETAILED DESCRIPTION

Figure 1:
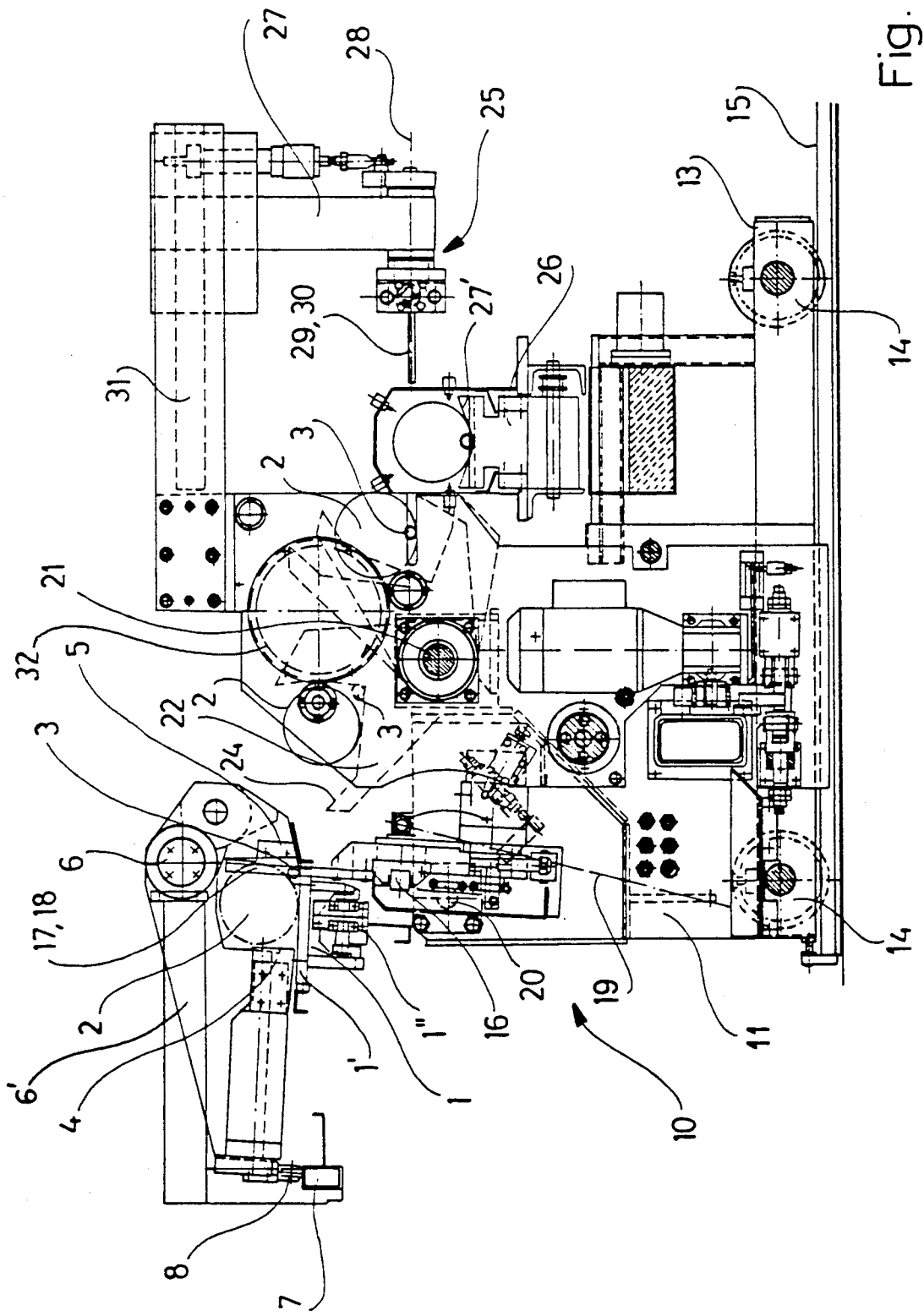
FIG. 1 is an end view of the apparatus, partly in section, along the line I—I of FIG. 3.
Figure 2:
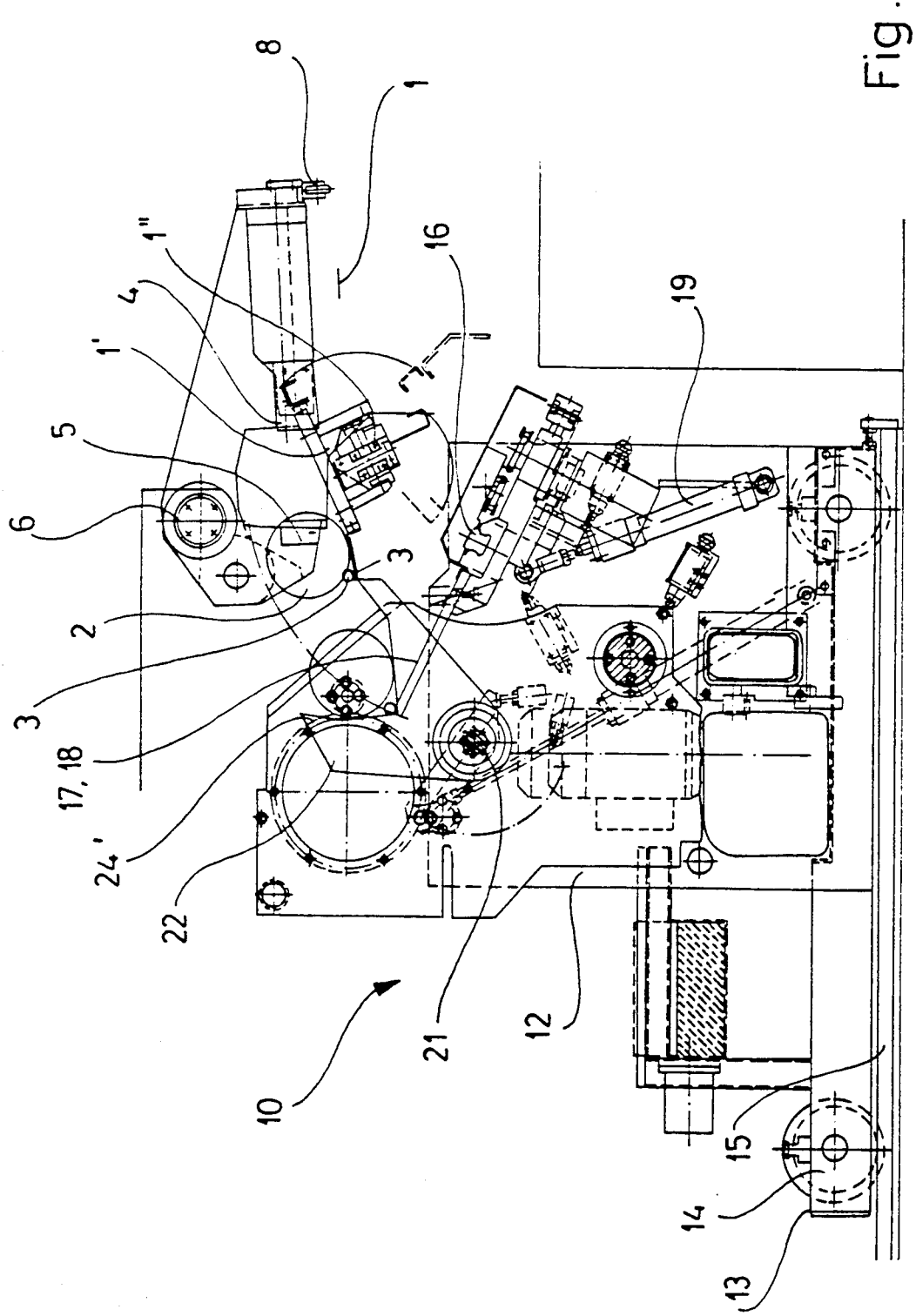
FIG. 2 is an end view, reversed 180° with respect to FIG. 1, and taken along line II—II of FIG. 3.
Figure 5:
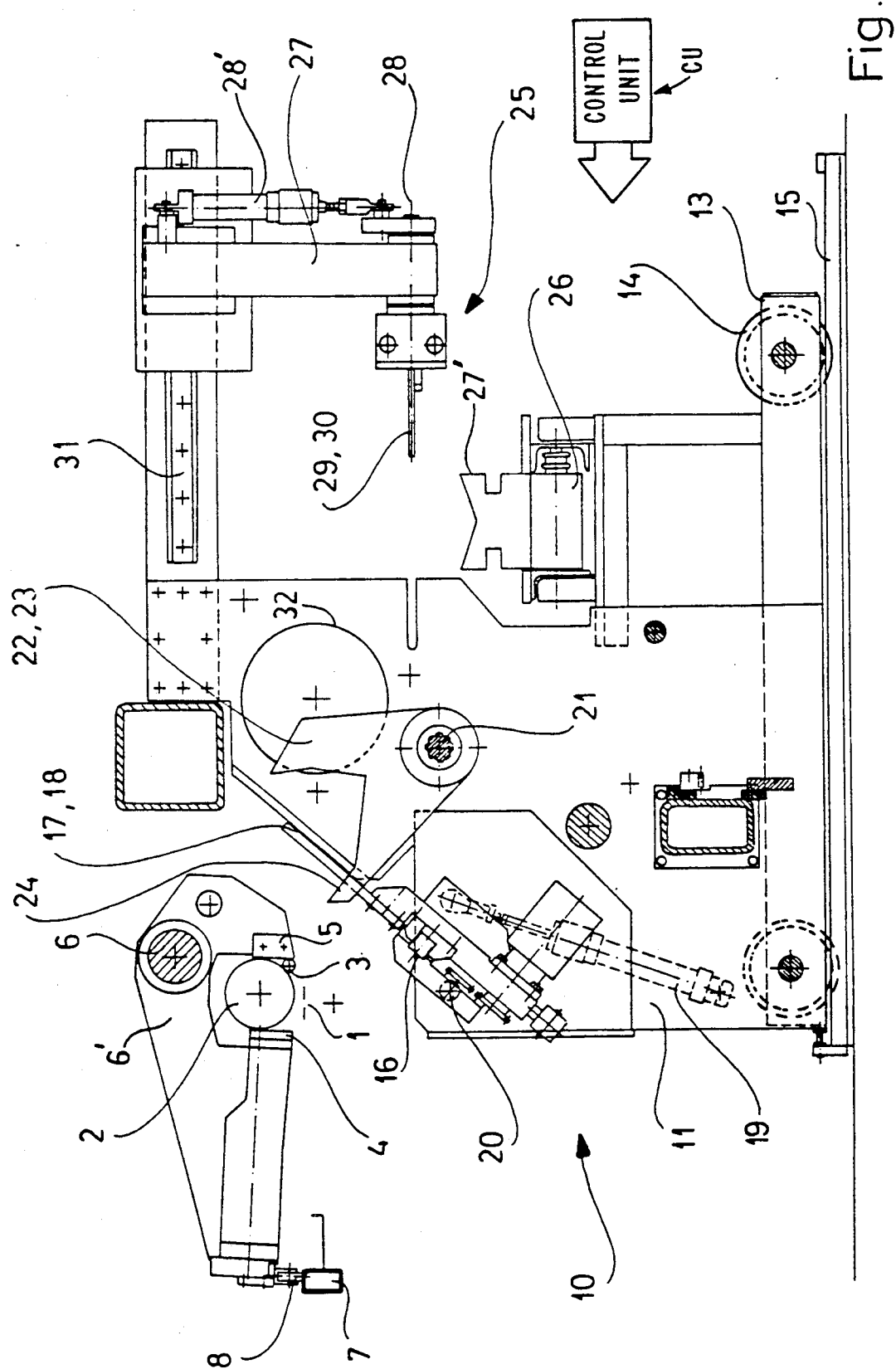
FIG. 5 is a simplified highly schematic representation of the major elements of the system shown in FIG. 1.

Referring first to FIG. 5 and to FIGS. 1 and 2:

A conveyor 1, shown only schematically, transports workpieces or other cut-off elements from a cutting or severing machine to the apparatus and system of the present invention. The cut-off elements need not all be workpieces. If the cutting machine is a miter saw, and successively makes straight 90° cuts across a rod-shaped stock material and then a miter cut, a wedge-shaped scrap element or sliver will be generated. While it need not be presented to subsequent machine tools for handling, the apparatus of the present invention also permits disposing of such scrap cut-off material independently of subsequent handling. The cut-off workpieces or elements 2, 3 define end regions, which may be end faces, end surfaces, or edges (if a miter cut was made) and a stem portion therebetween.

The conveyor 1 is, typically, a roller or track conveyor on which cut-off elements 2 and 3 are fed. The cut-off elements, also, are fed by transport jaws 4, 5 in a direction perpendicular to the plane of the drawing, FIGS. 1, 2 and 5. The transport jaws 4, 5 are located above the conveyor 1 and include a support bridge, slidable along a rail 6 of circular cross section, to overlap and engage around the workpiece or workpieces 2, 3. Gripping around and overlapping the workpieces is, of course, independent of the conveyor 1. Positioning of the cut-off elements depends essentially on the position of the transport jaws 4, 5 which receive the respective cut-off elements after they have been severed from the stock material fed to a severing machine.

The conveyor 1 has rollers 1' which can move longitudinally on wheels in a feed direction of the cut-off elements 2, 3, out of the plane of the drawing (FIG. 1). The transport jaw 4 can be moved transversely towards and away from the workpiece material; the transport jaw 5 has a fixed position on the bridge overlapping the cut-off elements, to form a locating surface for the cut-off elements. The transport jaws 4, 5 can move in a direction parallel to the feed direction of the cut-off elements 2, 3 on a track 7, on which they are supported by a roller 8 to prevent tipping of the jaws in their jaw holder 6'.

Frames and other support elements which support the roller conveyor 1 and the track 7 have been omitted from the drawing for clarity.

In accordance with the present invention, an apparatus to remove workpieces from the delivery system 1, 4, 5 is located adjacent the conveyor 1. Generally, the structure of the conveyor 1 is described in the referenced U.S. Pat. No. 4,252,040, Kiefer, assigned to the assignee of the present application, the disclosure of which is hereby incorporated by reference. A frame 10, having side walls 11, 12, is movable on wheels 14 running on rails 15 to permit moving the apparatus towards and away from the conveyor 1. Thus, the frame 10 and the side walls 11, 12 form an integral movable structure 13.

A guideway 16 is located between the side walls 11, 12. It is positioned below the conveyor 1 and extends parallel to the feed direction of the cut-off elements, that is, perpendicular to the plane of the drawings (FIGS. 1, 2, 5). Transfer jaws 17, 18 are shiftable along the guideway 16, movable parallel to the feed direction of the cut-off elements. The transfer jaw 17 is a short-stroke jaw. The transfer jaw 18 can carry out a long stroke to fit the respective length of the cut-off element, so that the workpiece can be gripped at its end regions, by holding the workpiece in an axial grip. As best seen in FIGS. 1 and 2, the guide track 16 and the transfer jaw 17, 18 form a unit which is pivotable by a cylinder-piston unit 19, to pivot as a unit within the machine frame 10 between the track or path of the cut-off element 1 and a position remote with respect thereto. The pivot axis is shown at 20, see FIG. 5.

In addition to the transfer jaws 17, 18, a workpiece receiver 22, 23 is located between the walls 11, 12. The receiver elements 22, 23 can be pivoted by rotation or turning of a shaft 21. The elements 22, 23 have an upwardly open, fork-like recess 24, 24' which, generally, has a prismatic shape, into which the cut-off elements 2, 3 can be placed by the transfer jaws 17, 18 upon movement away from the conveyor 1, as best seen in FIGS. 1 and 2, where the cut-off elements 2, 3 are clearly shown. Upon pivoting by shaft 21, the receiver 22, 23 centers the cut-off elements 2, 3. The recesses 24, 24' centrally position the cut-off elements and thereby locate the cut-off elements at predetermined positions on the receiver, which may differ from their prior positions.

Figure 3:
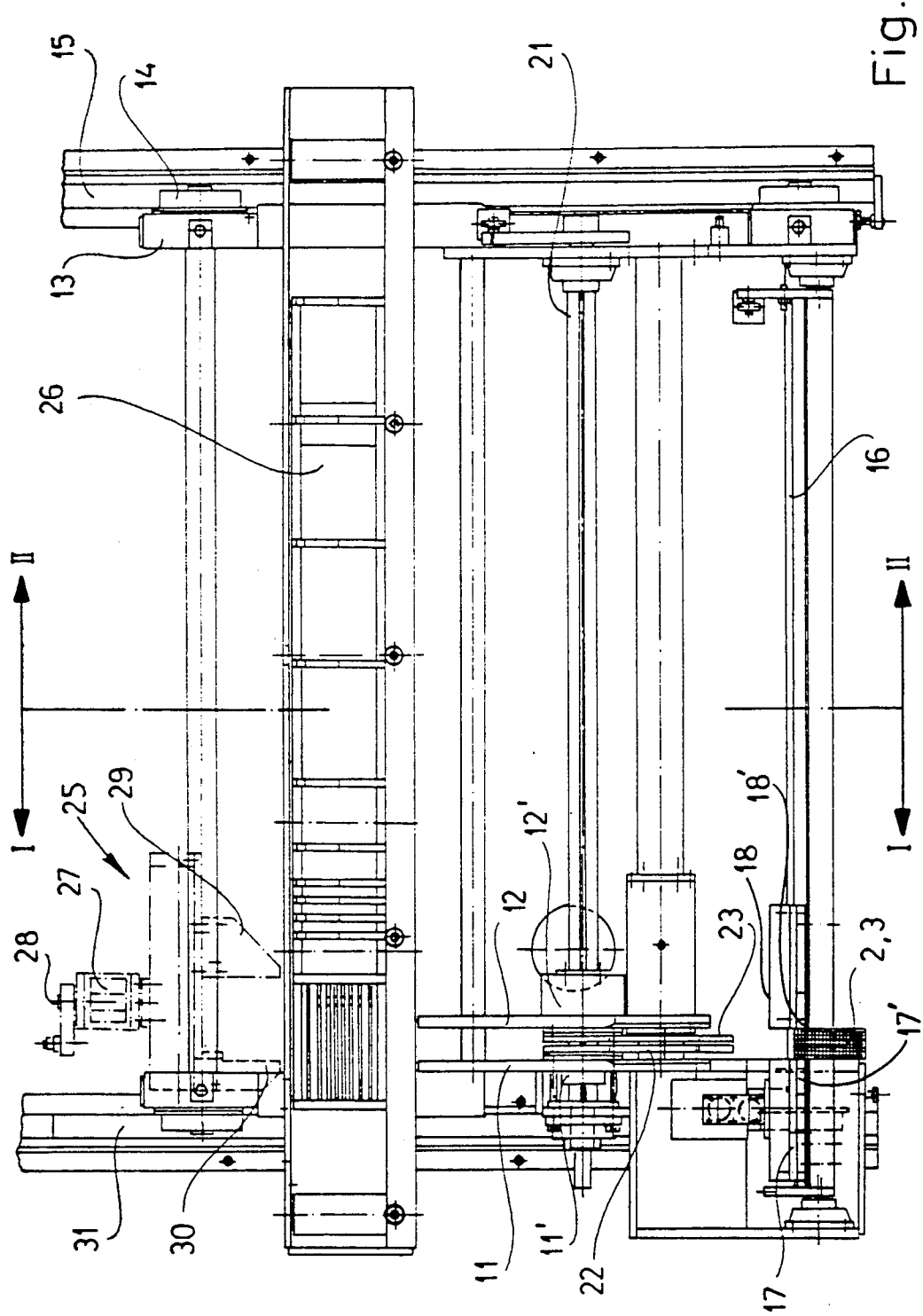
FIG. 3 is a top view of the apparatus of FIGS. 1 and 2.

The workpiece receiver 22, 23 are adjustable along the shaft 21. Spring elements 11', 12' (FIG. 3) act on the receiver elements 22, 23 and the frame walls 11, 12, respectively. The spring elements 11', 12' are adjustable along the shaft 21 by acting on the side walls 11, 12. The spring elements 11', 12' ensure that the workpiece receiver elements, at normal or usual or average length of the cut-off elements have some spacing from the walls 11, 12; if very short cut-off elements are to be handled, the receiver elements 22, 23, by shifting of the walls 11, 12 with respect to each other, will move closer together so that both the walls 11, 12 as well as the receiver elements 22, 23 will have a lesser spacing.

The receiver elements 22, 23, which form receiver jaws, receive the stem portion of the elements 2, 3 and move the cut-off elements 2, 3 to transfer cut-off elements from the conveyor direction by pivoting from the left towards the right, as best seen in FIGS. 1 and 5 about the shaft 21, so that the cut-off elements will be moved in a position towards the right of the pivot axis 21. Various tilt positions of the receiver jaws 22, 23 are shown in sequential broken lines in FIG. 1. This also re-positions and re-centers the cut-off elements 2, 3 by action of the receiver jaws, to permit pick-up of the cut-off elements by a pick-up gripping system generally shown at 25 in FIG. 5 for placement on a transport or conveyor 26, which has an upwardly open prismatic receiving portion 27'.

The gripping system 25 includes an essentially vertical gripping arm 27. The gripper 29, 30 itself is secured to the lower portion of the vertical arm 27. It is rotatable in arm 27 about an essentially horizontal axis 28 (FIGS. 1, 5) and which is oriented perpendicularly to the material feed direction of the material supplied by the conveyor 1. The gripping unit or portion has a pair of clamping or gripping jaws 29, 30 which are arranged to grip the cut-off elements 2, 3, respectively, at the end regions, that is, at the cut ends or cut faces the cut-off elements, thus, and place them on the transport conveyor 26 for delivery to a conveyor delivery station; alternatively, and in accordance with a feature of the invention, the gripping unit can deliver the cut-off elements, especially if they are workpieces, in a different alignment or orientation from that in which they were picked up, for example rotated 90°. With such shift in position or orientation, the workpieces can then be placed on the transport conveyor or transferred to some other removal apparatus, or to a receptacle or to a storage bin, in any desired orientation, for example for storage or further transport, for further handling, machining, or working on the workpiece.

The gripping apparatus or unit 25, thus, is highly versatile. It is slidable in tracks 31, secured to the frame 10 of the machine in any suitable manner, so that the grippers 29, 30, secured to the arm 27 can be moved between positions to receive workpieces from the receiver 22, 23, and away therefrom. A piston-cylinder unit 28' is coupled to the gripping unit 25 for positioning of the gripping jaws 29, 30 in appropriate positions for gripping workpieces.

As workpieces are transferred by the receiver 22, 23 from the transfer jaws 17, 18 to the gripping system 25, the end faces of the workpiece can be worked on, for example for removal of burrs and the like. Metal brushes, grinding disks and the like, schematically shown at 32, are arranged in the path of rotation or tipping of the receiver 22, 23, upon rotation of the shaft 21, which are provided to remove burrs or other imperfections arising due to cutting of the workpieces from a stock rod, rail or the like.

A control unit CU, of any suitable and well known type, controls the sequencing of operations. The control unit CU can be a manually operated unit or computer-controlled, numerically controlled or the like.

The essential characteristics of the arrangement 10, in accordance with the present invention, has been described. Standard structural elements used in mechanical apparatus have been omitted from the drawings, since they do not form part of the present invention, and can be arranged as well known in machine tool practice. For example, the guide track 31, secured to the machine frame, can be arranged in any suitable manner, providing merely for lateral transport of the gripping unit 25.

Figure 4:
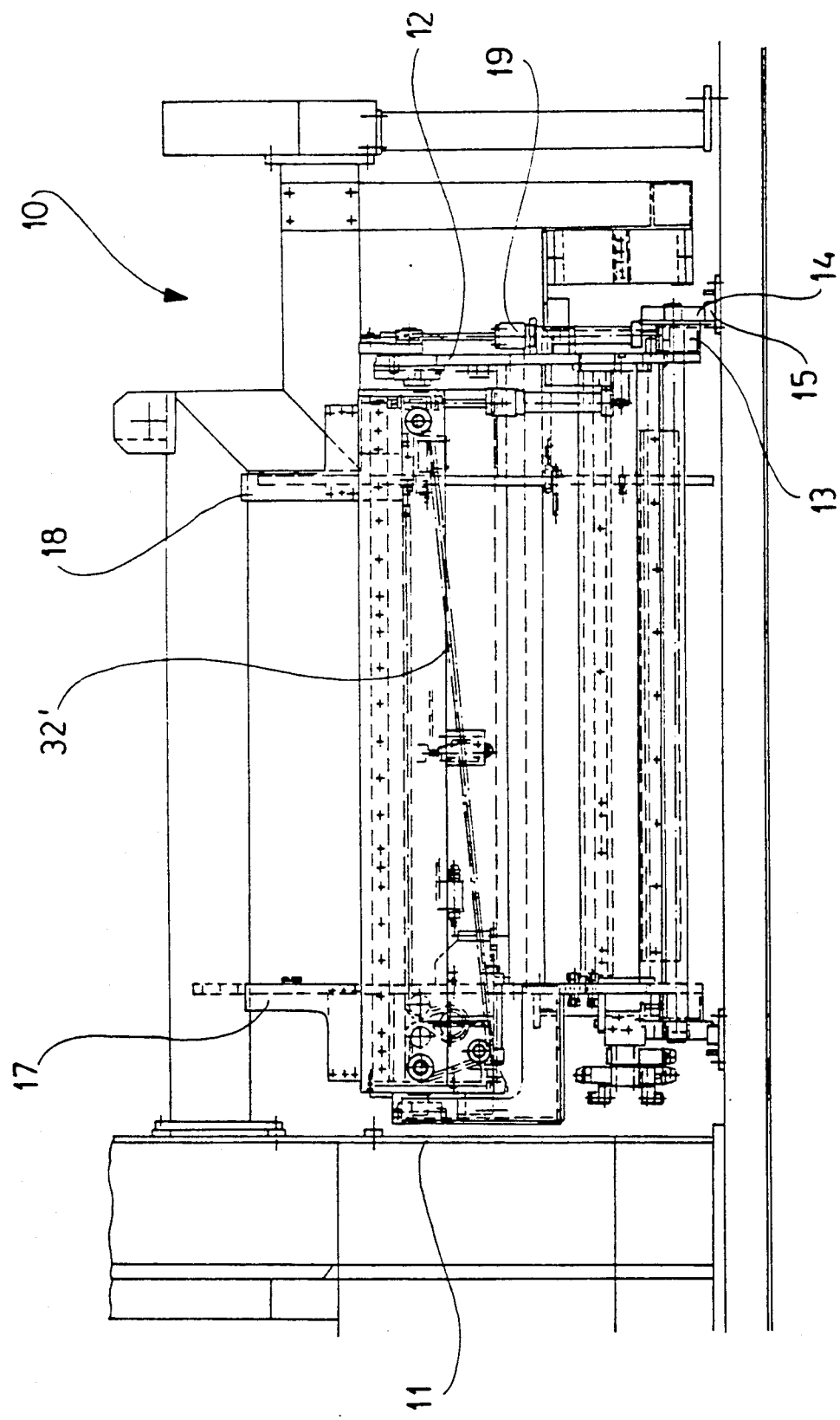
FIG. 4 is a front view of the apparatus looked at from the side of the workpiece conveyor delivering workpieces thereto.

FIG. 4 is a side view of the system, looked at from the side of the delivery conveyor 1, and clearly shows positioning of the transfer jaws 17, 18, and their range of movement. An endless cable, chain or similar element 32', coupled to the jaw 18, can move it laterally back and forth, driven by a suitable motor (not shown in FIG. 4), and controlled by the control unit CU.

OPERATION, SHORT WORKPIECES, WITH REFERENCE TO FIGS. 6-7

FIGS. 6 through 24 are fragmentary views comparable to FIGS. 1 and 5. The transport conveyor beneath the transport jaws 4, 5 have been left off for clarity.

FIG. 5 illustrates generally the apparatus in an initial or start or rest position, in which a workpiece 2, or 3—both being shown adjacent each other to show the difference in sizes which can be handled by the apparatus—is transported by the conveyor 1 and the transport jaws 4, 5. The cut-off element or workpiece element 2, 3 is in engagement with the fixed jaw 5, that is, in a predetermined "ready position".

The transfer jaws 17, 18 are out-of-engagement with the workpiece and located, by operation of the cylinder-piston unit 19, by being tipped in the position shown in FIG. 5 about their tipping or rotation axis 20.

Figure 6:
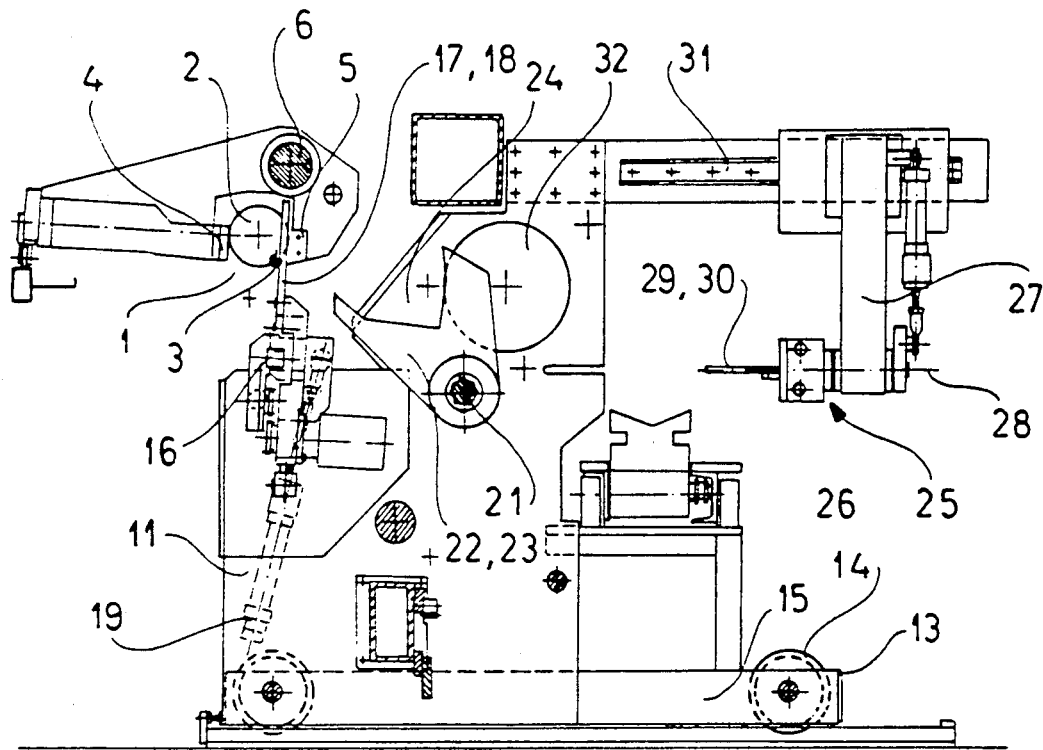
FIGS. 6-17 are diagrammatic drawings, similar to FIG. 5, and illustrating the various operating steps carried out by the system of the present invention.

It is assumed, here, that severed cut-off elements 2, 3 are supplied. FIG. 6 now shows tipping or tilting of the transfer jaws 17, 18, together with their guideway 16 by the cylinder-piston unit 19 into the cross-sectional range of the cut-off elements 2, 3. The transfer jaws 17, 18 will reach a region of the cross-sectional area, i.e. the end faces, or ridges if a miter cut as made of the cut-off element close to the fixed jaw 5 of the conveyor system. Thus, the transfer jaws 17, 18 can grip any kind of workpiece, regardless of size or cross-sectional shape or area. Large cut-off elements or workpieces are gripped laterally; small cut-off elements can be gripped completely, for example throughout their entire cross-sectional area. This is clearly apparent from a consideration of FIG. 5 and the workpiece elements 2, 3.

At the same time—for example under control of the control unit CU—the projecting workpiece receiver elements 22, 23 are so pivoted about their pivot axis 21 that their prismatic opening portions 24, 24' are upwardly open and facing the conveyor 1.

Figure 7:
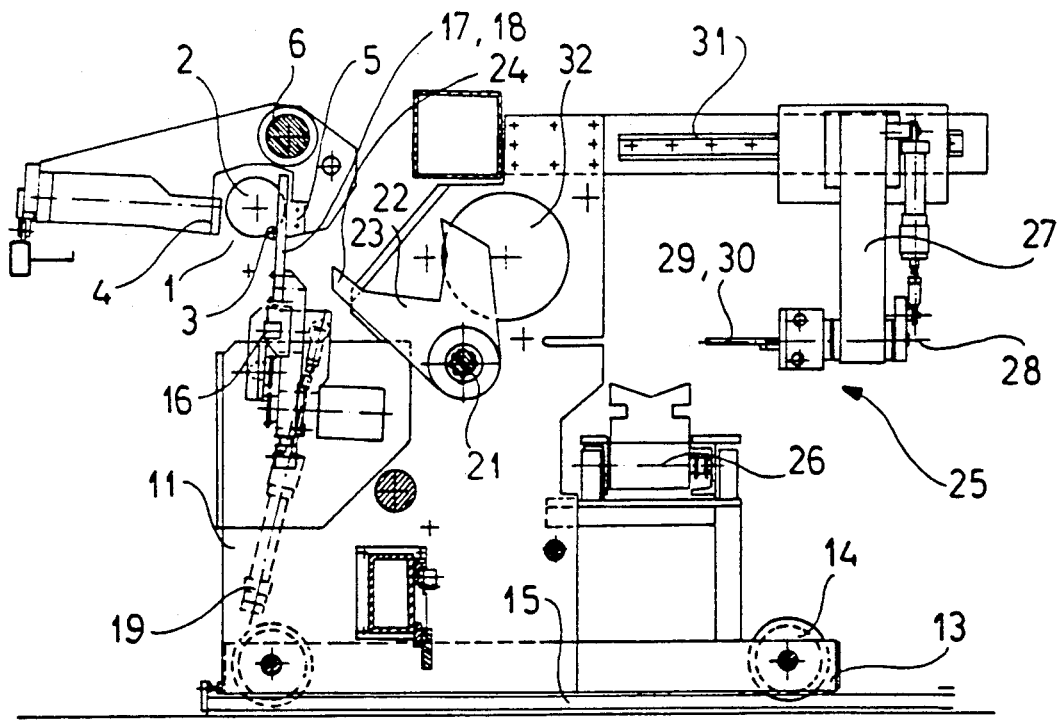

In the next operating step—see FIG. 7—the transfer jaws 17, 18 have gripped the cut-off element 2, 3, respectively; the supply jaws 4, 5 have opened, that is, the jaw 4 has separated from the workpieces.

Figure 8:
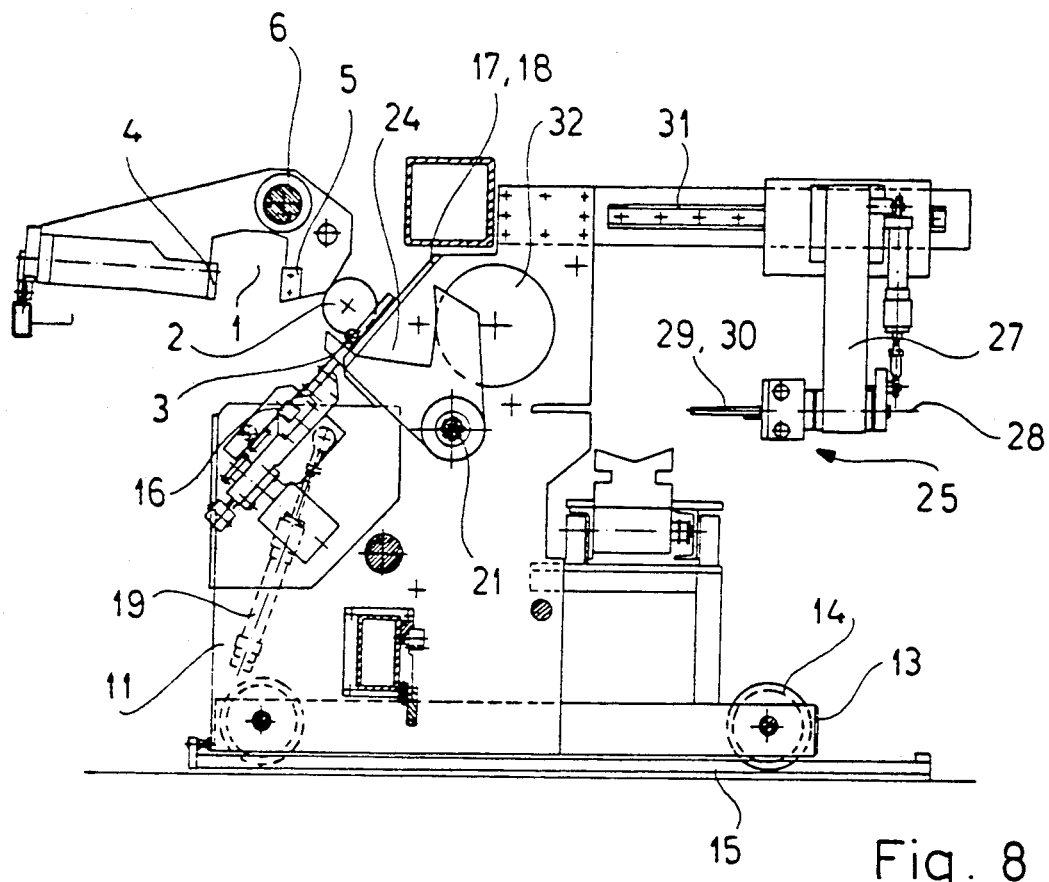

As seen in FIG. 8, the cut-off elements 2, 3 are now tipped away from the path of conveyor 1. At that time, the conveyor jaws 4, 5 can retract in the direction of the severing machine, to pick up another workpiece. Thus, they will not be in the path of the transfer jaws 17, 18.

Figure 9:
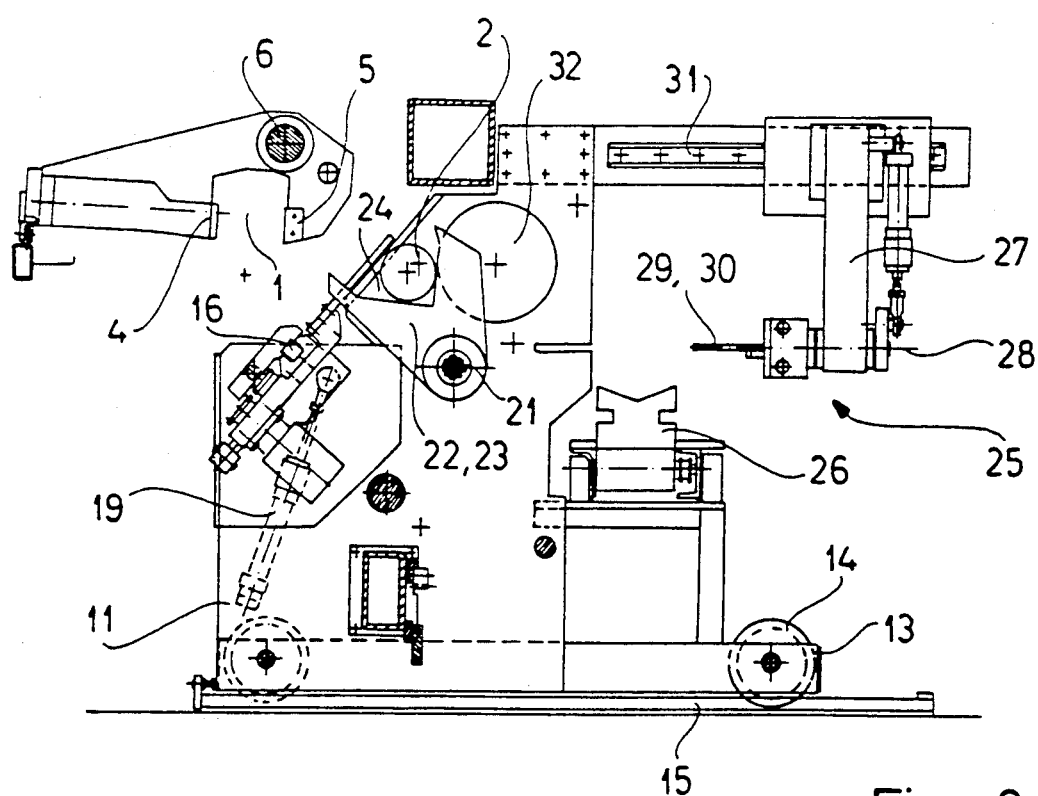

FIG. 9 shows placement of the stem portion of the workpiece 2, 3, respectively, into the upwardly open recesses or openings 24,24' of the receiver elements 22, 23 by the transfer jaws 17, 18.

The receiver then rotates about the axis of shaft 21 away from the path of the conveyor 1. In this movement, it passes the end treatment element 32, for example brushes or the like which remove any projecting burrs at the end faces of the workpieces. No interruption of the pivoting movement is necessary since the polishing or burr removal of the end faces can be carried out as the receiver 22, 23 tilts about the axis 21. In other arrangements, the tilting movement can be interrupted when the workpieces come within the range of the brushes 32 in order to provide sufficient time for suitable working of the end faces.

Figure 10:
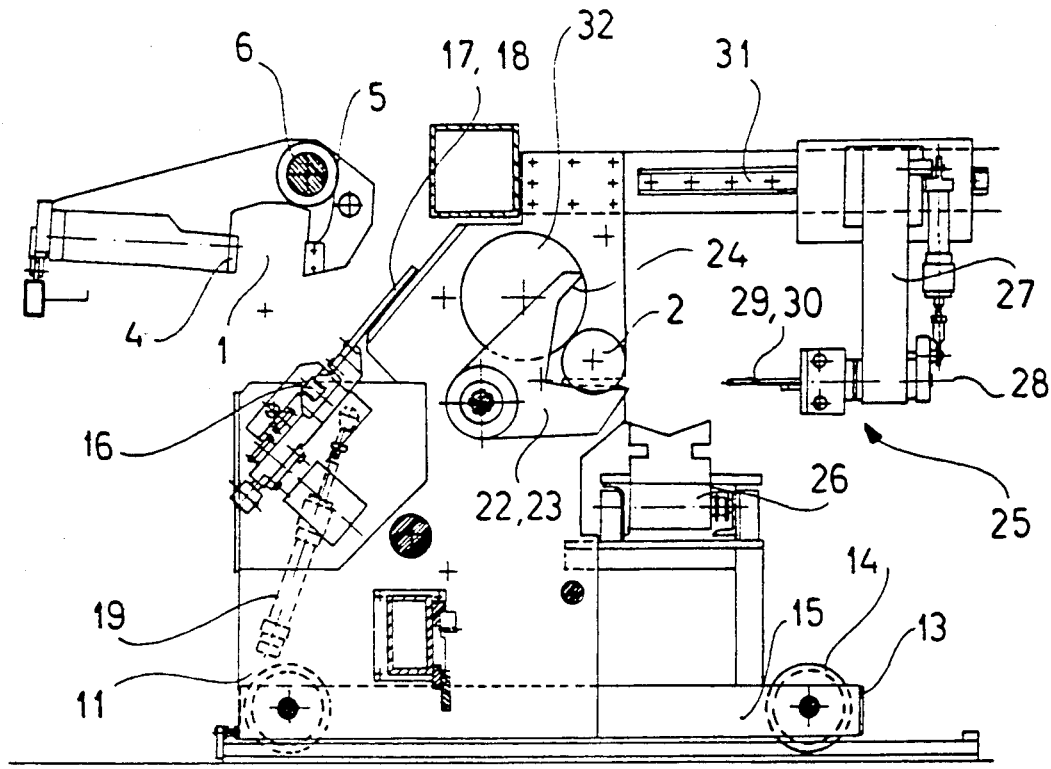
Figure 11:
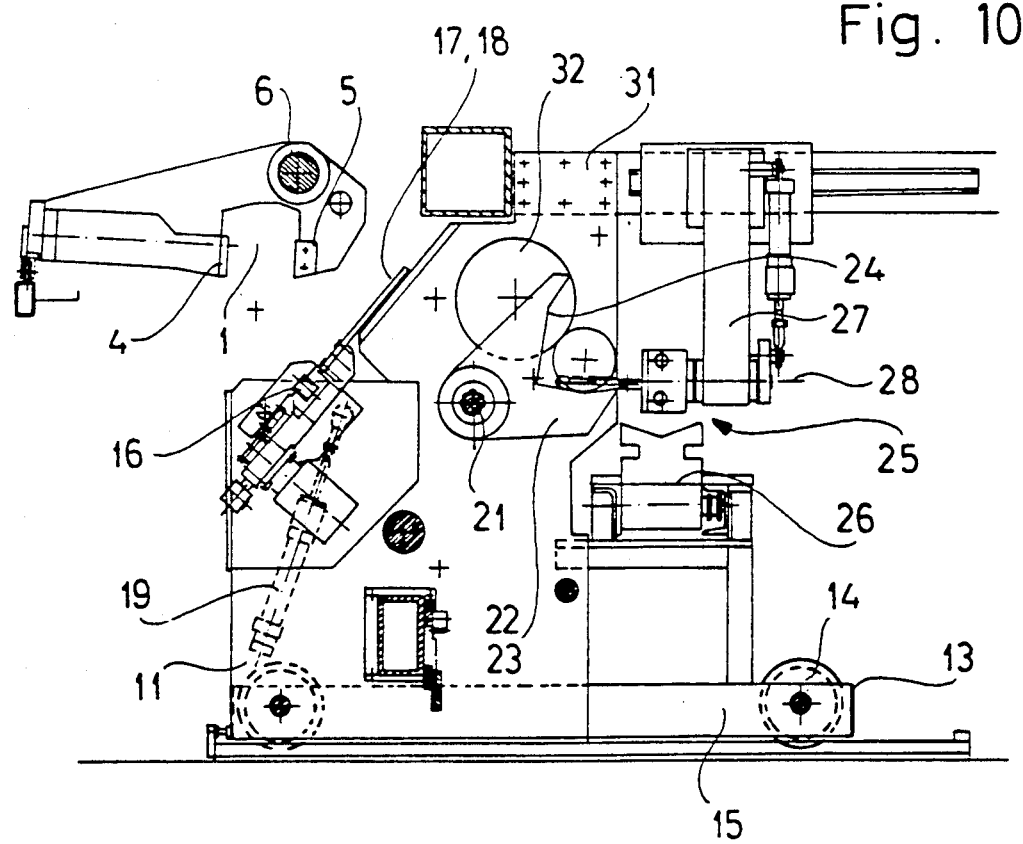

After the receiver 22, 23 has tilted to the position shown in FIG. 10, the cut-off element 2, 3, respectively, is lifted off the receiver 22, 23 by the gripping jaws 29, 30 of the gripping unit 25, see FIG. 11. The gripping unit, then, as seen sequentially in FIGS. 12-15, will place the workpiece on the further transport or removal conveyor 26.

Figure 12:
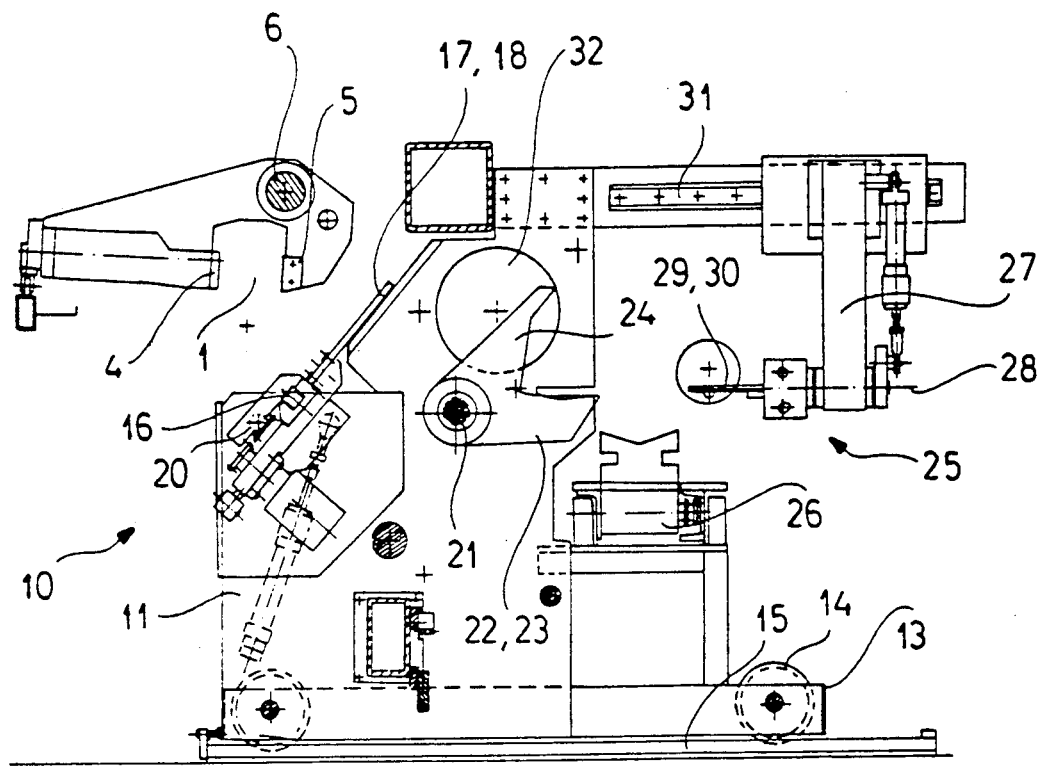
Figure 13:
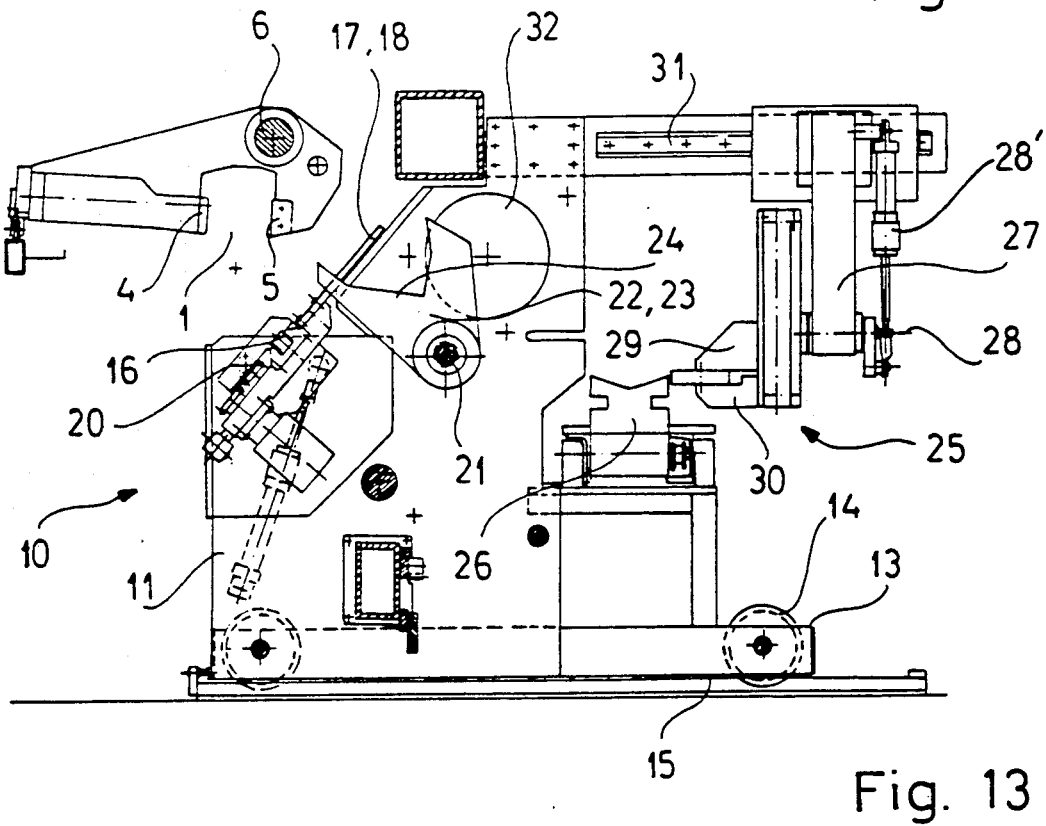
Figure 14:
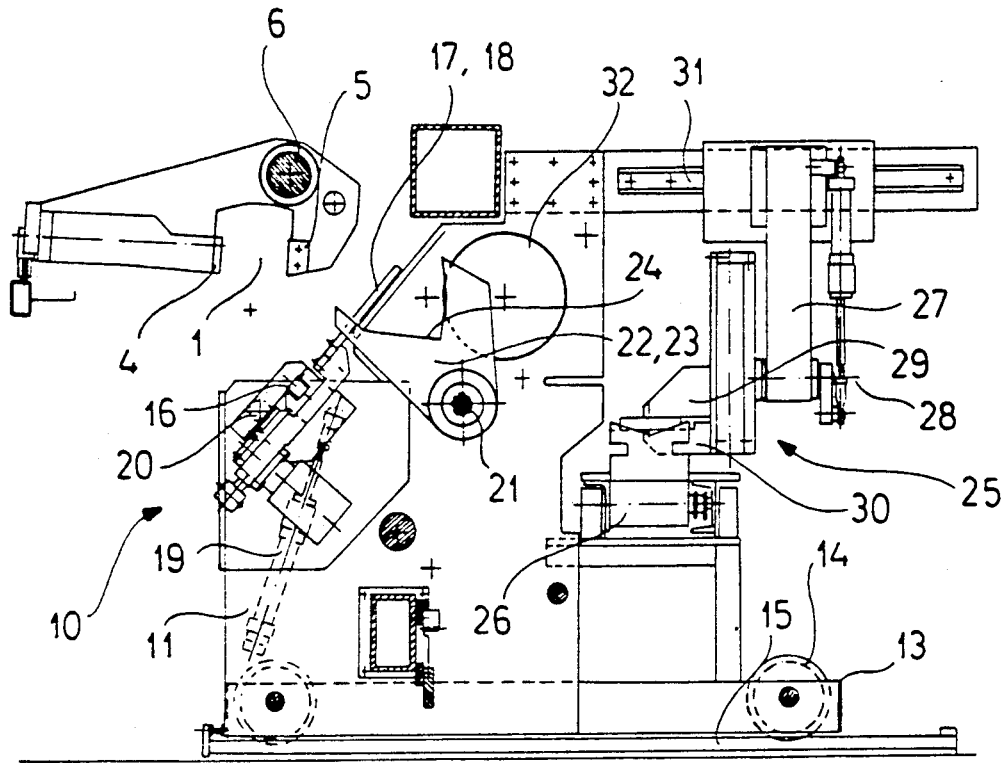
Figure 15:
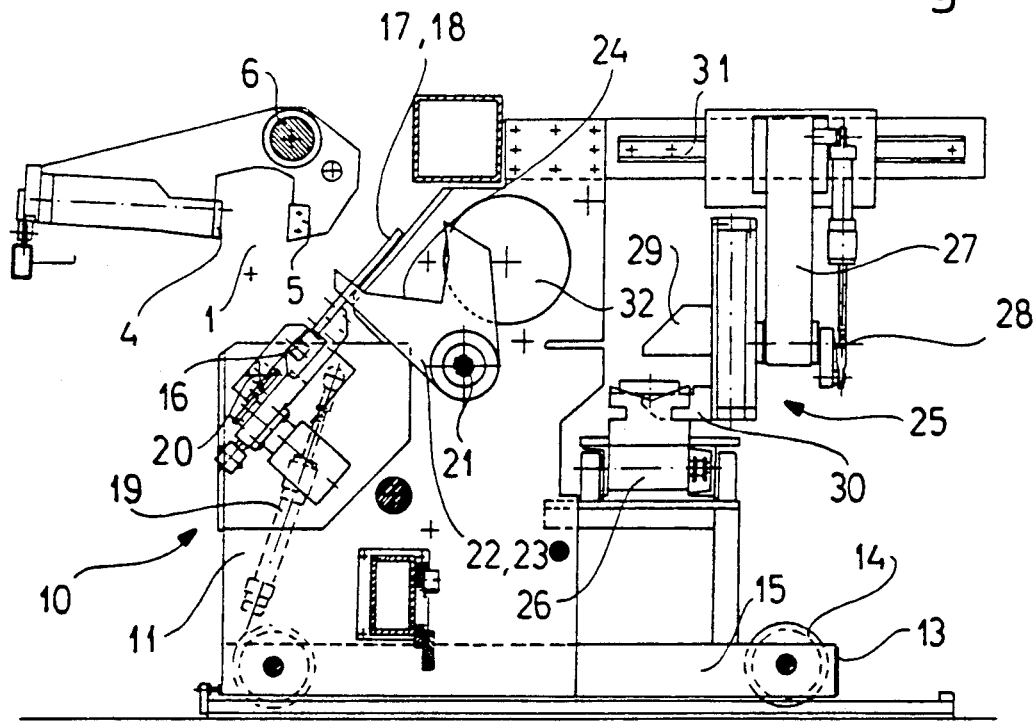
Figure 16:
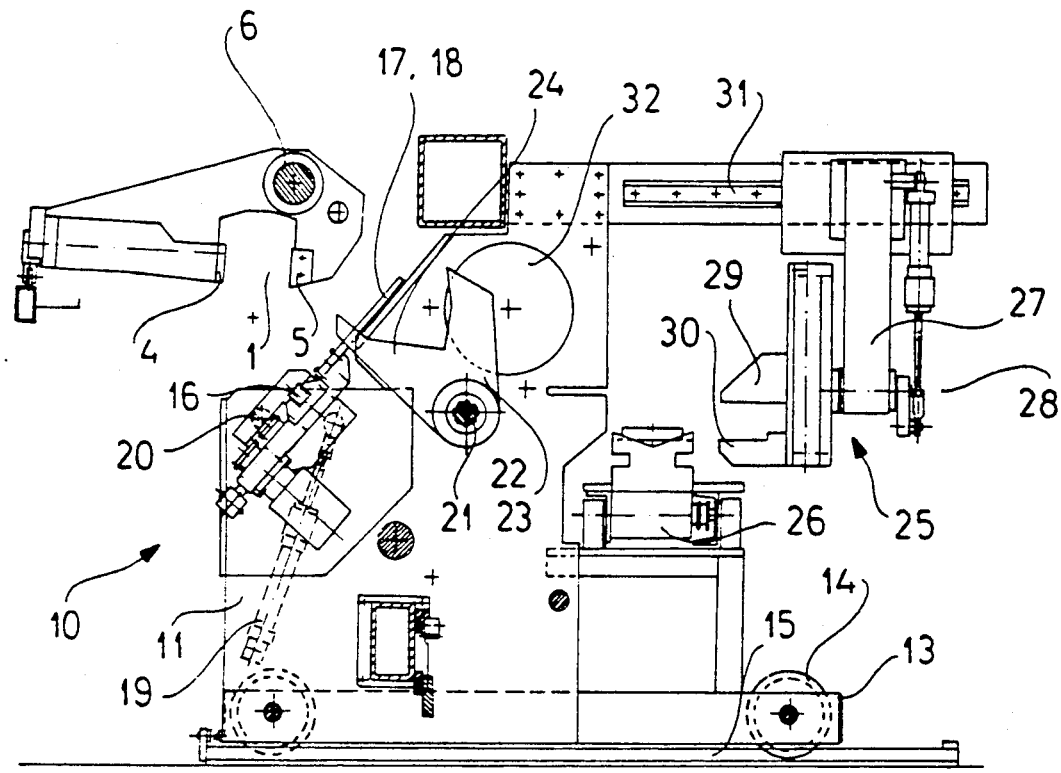
Figure 17:
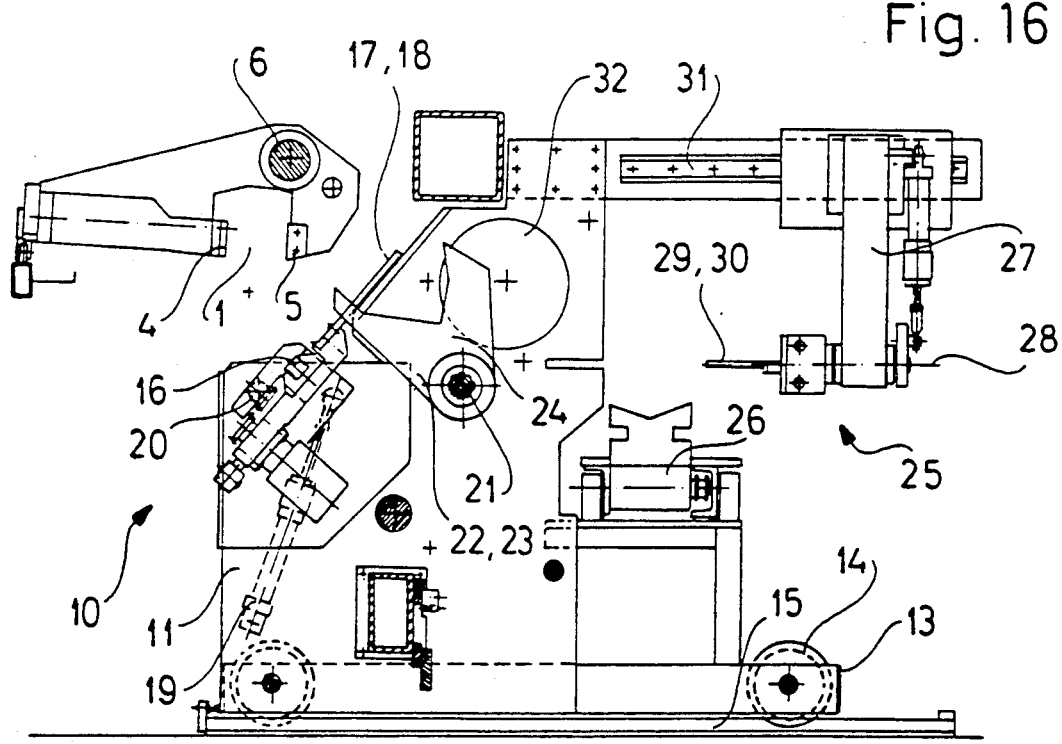

Let it be assumed that the cut-off element 2, 3 is a comparatively narrow disk. FIG. 12 illustrates pick-up of such a disk by the gripping unit 25, which then is rotated by 90°—see FIG. 13, and lowered by the cylinder-piston unit 28', to be placed, in 90°—rotated orientation, on the removal conveyor 26, see FIG. 14. After placement on the removal conveyor 26, the gripping jaws 29, 30 separate—see FIG. 15—and retract towards the right on the slide 31. FIGS. 16 and 17 illustrate return of the gripping unit 25 to the initial position shown in FIG. 5.

This ends one cycle of operation, and the entire operating cycle, starting from the illustration of FIG. 5, can repeat.

Of course, the respective operating steps which have been described sequentially with respect to any one cut-off unit or workpiece can be carried out simultaneously with respect to various workpieces. For example, the transfer jaws 17, 18 can grip a new workpiece from the severing machine, that is, from the conveyor jaws 4, 5, at the same time that the preceding workpiece is in the receiver, for example for end-facing by the brushes 32, while a still preceding unit is being re-oriented for placement on the delivery conveyor 26.

If the workpieces are of substantial length, which does not occur too frequently, it is not desirable to handle the workpieces from the end faces, since they may buckle or be stressed longitudinally, and deform under the stress. Thus, the transfer jaws 17, 18, preferably, should then not grip axially at the ends.

OPERATION, LONG WORKPIECES, WITH REFERENCE TO FIGS. 18 THROUGH 24

The conveyor system 1 then, preferably, is formed by a roller conveyor having rollers 1'. This roller conveyor is so arranged that it can tilt about an axis parallel to the path 1 of the conveyor. In addition, the conveyor 1 is formed with an abutment or guide sheet 33 against which, upon tilting of the roller conveyor, the workpieces can engage.

Figure 18:
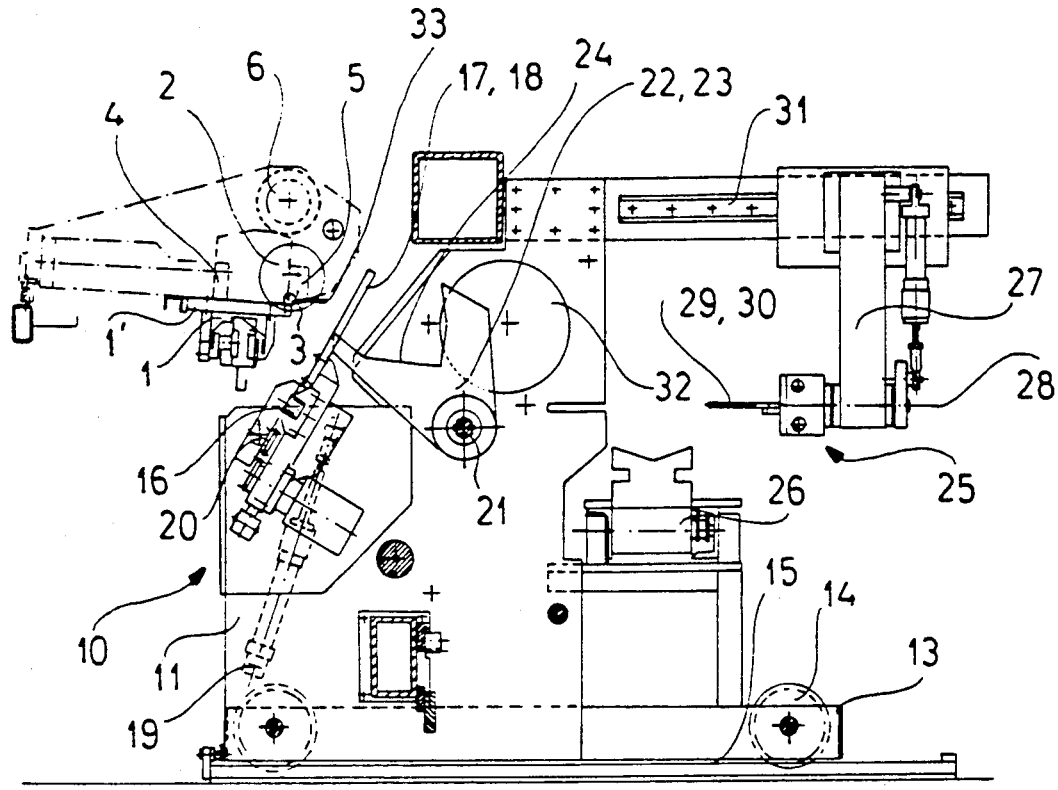
FIGS. 18-24 are diagrammatic drawings similar to FIG. 5, and illustrating another sequence of steps in the handling of workpiece elements, in accordance with the system of the present invention.
Figure 19:
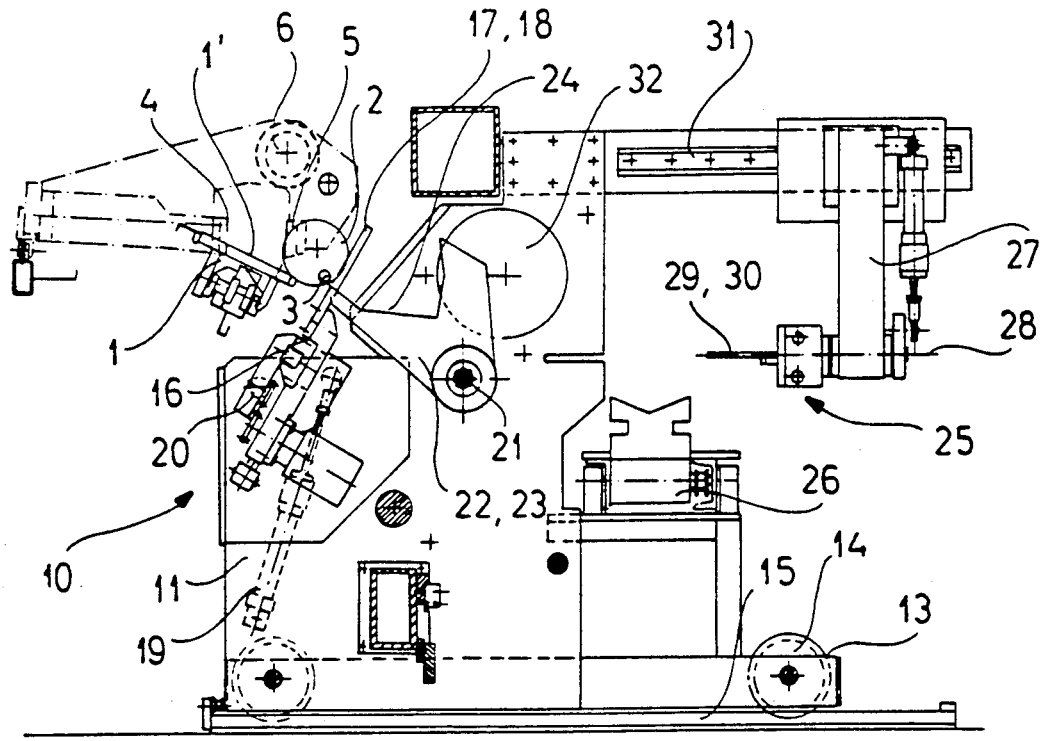

Control rollers 1" (FIGS. 1, 3) are provided to control the orientation of the rollers 1' of the conveyor 1 to control tilting or tipping thereof from the horizontal position shown in FIG. 18 to the tilted position shown in FIG. 19. If the workpiece, for example, is a long shaft, the workpiece, upon tipping of the conveyor 1'—see FIG. 19—is unloaded along the abutment and transfer element 33 directly into the fork-shaped opening 24, 24' of the receiver 22, 23. The transfer jaws 17, 18 to grip the ends of the workpiece are not used to transfer the workpiece; rather, they are moved outwardly, and merely form end engagement surfaces to provide for damped or braked transfer movement, usually rolling movement, of the workpiece along the guide sheet 33. This is particularly advantageous and made possible by the system in which the position of transfer jaw 18 can be matched to the length of the workpiece, so that engagement of the end faces against abutments, formed by the transfer jaws, which are resiliently deflectable, is possible, to provide for end-braking.

Figure 20:
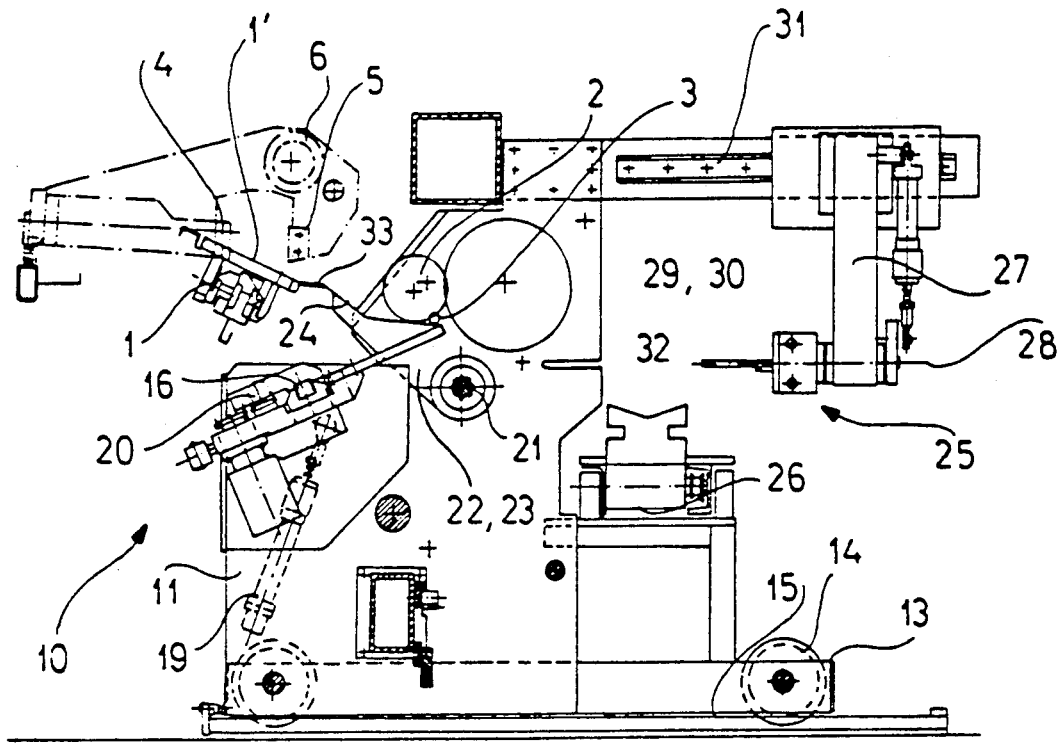
Figure 21:
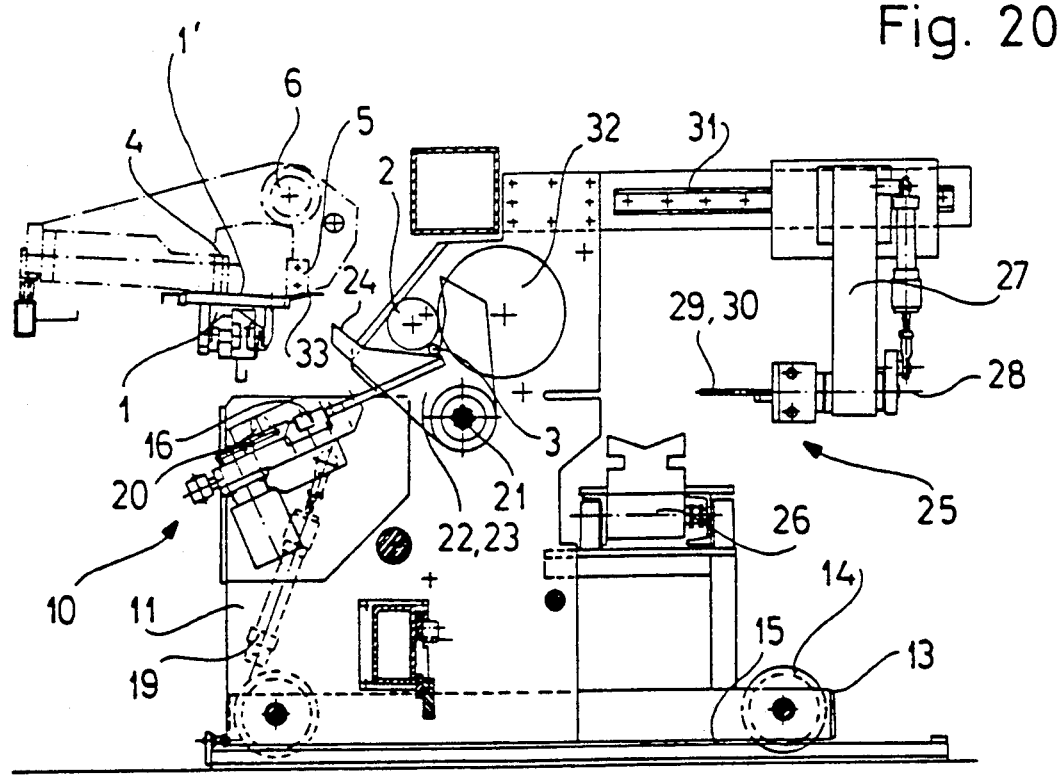
Figure 22:
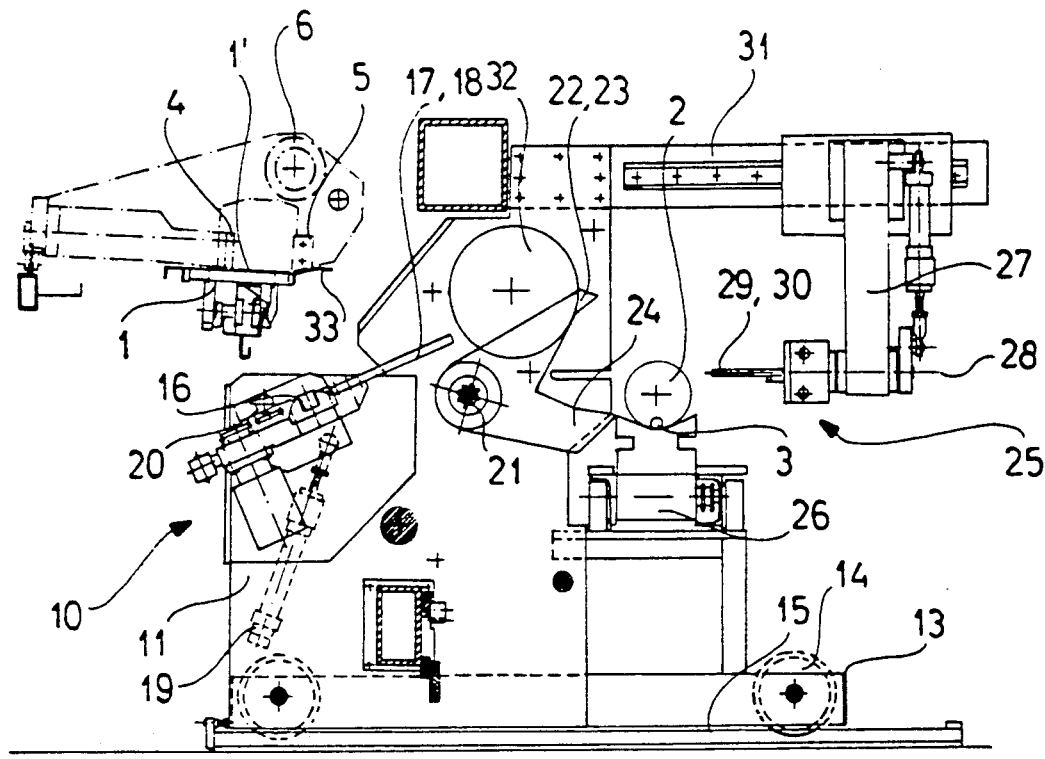
Figure 23:
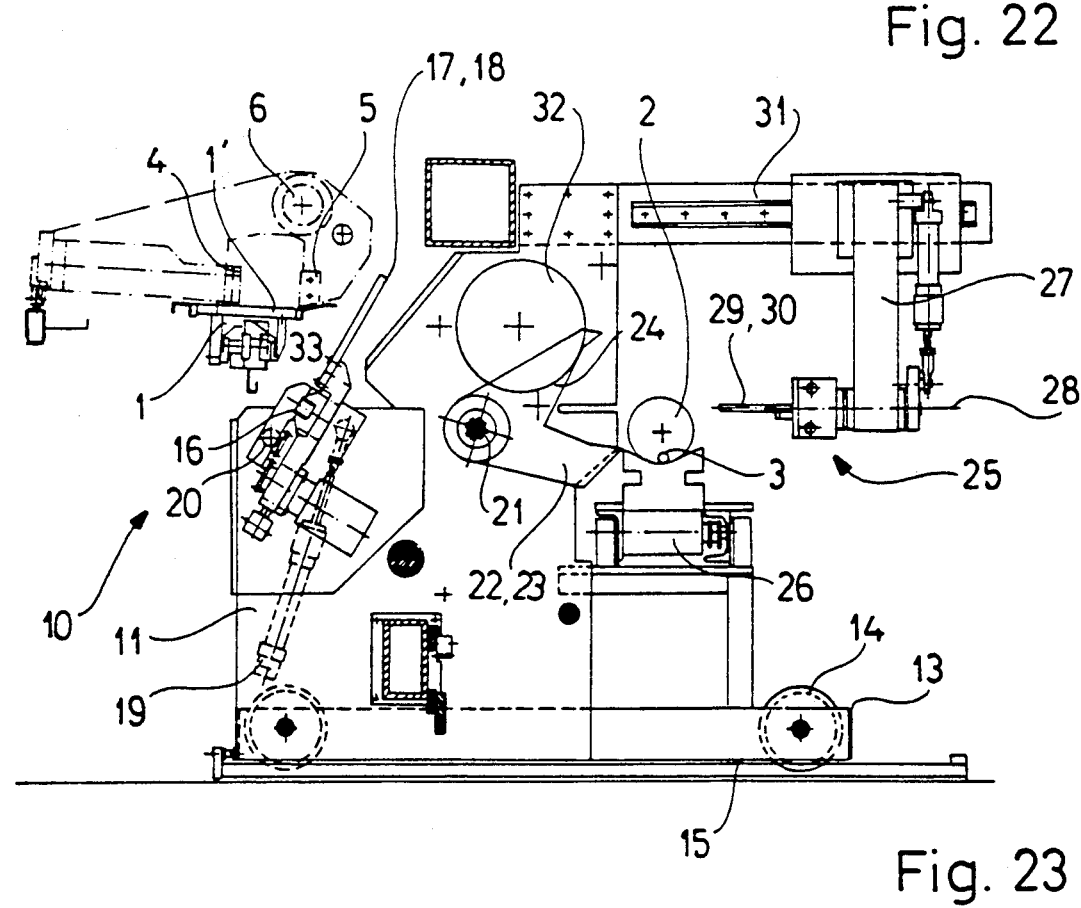
Figure 24:
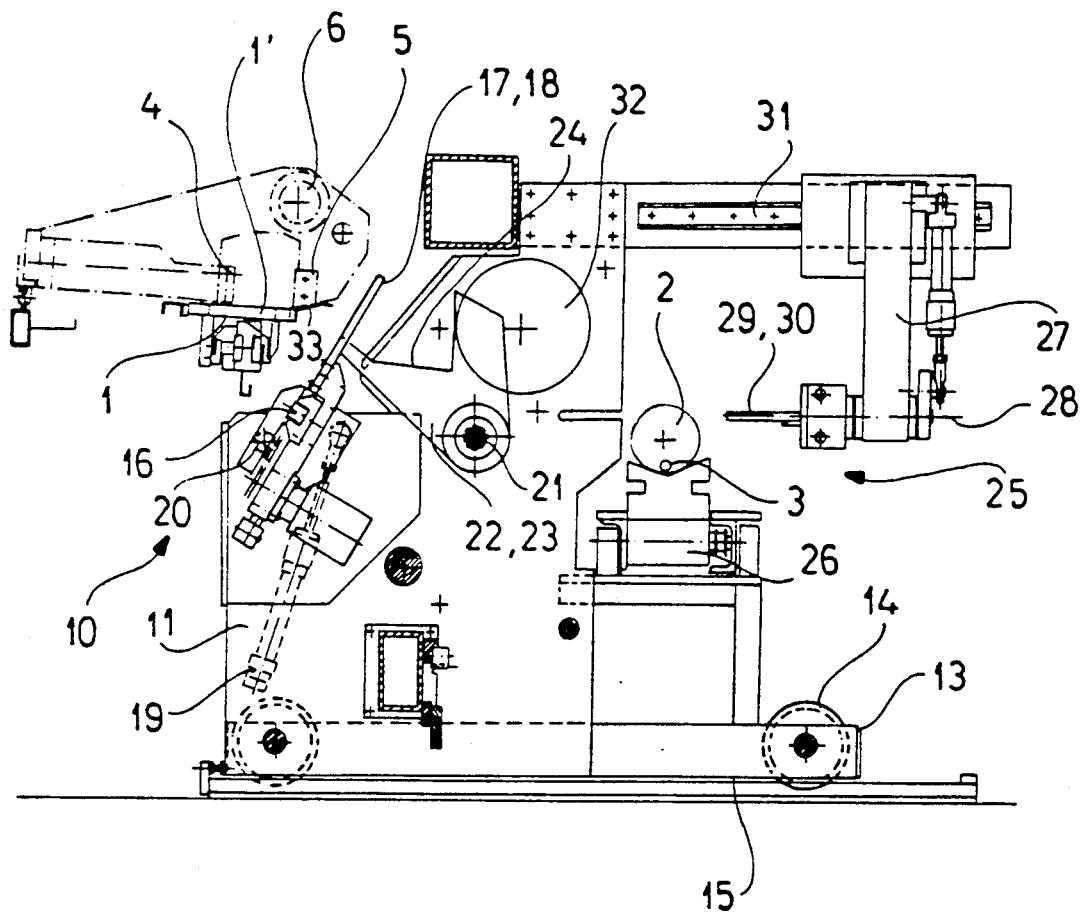

Long workpieces are then handled, as seen in FIGS. 20 and 21, as before. FIG. 22 illustrates tipping of the receiver 22, 23 in-line with the removal conveyor 26 for direct transfer thereto, and without use of the gripping unit 25, since such long pieces will not be rotated by 90° anyway. The gripping unit 25 then is not used in this transport. FIG. 23 is similar to FIG. 22 except that the transport jaws 17, 18 are moving towards the conveyor 1 to provide for braking of subsequent workpieces which may also be long, or for pick-up of shorter workpieces, while the previously handled workpieces 2, 3 are now positioned in predetermined alignment on the removal conveyor 26. FIG. 24, then, finally, illustrates the initially position, again, to receive a next workpiece from the conveyor 1.

Usually, cutting burrs arising in cut-off operations of elongated material are outside of the gripping range of the transfer jaws 17, 18. For handling of small workpieces, such as those illustrated at 3 in FIGS. 1 and 5, for example, it may be desirable to form the transfer jaws 17, 18 at the lower portion thereof with small recesses, extending in alignment with small workpieces, shown exaggerated at 17', 18' in FIG. 3. This ensures reliable gripping and holding of even the smallest workpiece by the transfer jaws, without possible interference by projecting burrs.

Placing the entire system on rails 15, so that it can be engaged against the conveyor by means of operating the rollers or wheels 14 of the frame 13, or removed therefrom, permits versatile association of the system with a severing machine, or a removal conveyor, or replacement by other apparatus. It is particularly suitable for handling workpiece which can be gripped at end faces, or any kinds of workpieces in which working or treatment of the end faces of the workpiece is desirable, for example for removal of burrs, cutting striae or the like.

The apparatus, as described, is simple and hence reliable, and is particularly adapted for association with a severing or cutting machine, for example as described in the copending application U.S. Pat. Ser. No. 07/558,148, filed Jul. 25, 1990, Stolzer, assigned to the assignee of the present application.

The receiver 22, 23, with its fork-like upwardly open structure, pivotable about pivot axis 21, is particularly suitable to receive workpieces or other cut-off elements from a severing machine. It operates entirely automatically, and provides for reliable placement in the fork-shaped opening 24, 24' for subsequent placement of the workpieces on the removal conveyor 26 in predetermined alignment or position. The capability of removing the workpieces from the delivery conveyor 1 and then re-orienting the workpieces before final delivery while a subsequent workpiece is being received in the receiver substantially reduces the cycling time with respect to a plurality of workpieces. The longitudinal slide path provided by the track 31, coupled with the up-down movement along the vertical support 27, under control of the cylinder-piston arrangement 28', as well as rotary movement of the gripping jaws 29, 30 about the axis 28, provides versatile handling capabilities for workpieces or cut-off elements of different shapes, sizes or cross sections. The gripping jaws 29, 30, of course, require that the workpiece presented to them is in a position where they can engage thereagainst. The receiver ensures that the workpieces are fed to the gripping jaws in such a position that they can grip the workpieces, for subsequent direct placement on the conveyor 26 or, if desired, rotated by 90°, or for placement on suitable pallets, or other receptacles, for example under numerical control of the control unit CU. They can be transferred by the conveyor 26 to automatic lathes, milling machines or the like, since they will be in predetermined oriented and aligned position and not be delivered at random. The movability of the gripping jaws 29, 30, both in rotary direction as well as up and down and right-left, ensures versatility with respect to the cross section and size of the workpieces.

The arrangement separates the various operating steps into handling steps of only short duration, which can be carried out simultaneously with respect to succeeding workpieces since transfer from the conveyor 1 by the transfer jaws 17, 18; reception in the receiver 22, 23 and—if desired—removal of end burrs by the brushes 32; and subsequent placement on the removal conveyor 26, coupled with possible re-orientation and re-alignment by rotation of the gripping jaws 29, 30, can be carried out simulteaneously with different workpieces. Thus, the system is easily adaptable to cutting machines which have extremely short cycling times and, further, are readily capable of handling stock material of different cross sections, sizes, materials, or shapes. Since the type of workpiece received from the receiving conveyor 1, for example the receiving jaws 5, 6 is known—if only stored electronically—it is easily possible to match the spacing of the receiving jaws 17-18, walls 11, 12 and receiver elements 22, 23, and the level of the gripping jaws 29, 20, as well as their position, to the workpiece which is then being handled. The apparatus, thus, does not require specific re-setting for any particular workpiece while waiting until a preceding workpiece has passed through all the operating steps.

Preferably, the axis 20 about which the guideway 16 of the transfer jaws 17, 18 is pivotable, is located beneath the plane of the receiving conveyor 1; in accordance with another preferred feature of the invention, the fixed jaw 5 of the receiving transport unit 4, 5 is located at the side adjacent that one where the transport jaws 17, 18 will grip the workpiece or, if the workpiece is very long, where they will brake a free roll-off or fall of the workpiece.

The system is highly versatile with respect to the dimension of the cross section of the workpieces. The transfer jaws 17, 18 can grip workpieces in the position defined by the feed jaw 5 adjacent the "ready" position of the workpiece. Thus, the transfer jaws can grip large workpieces, such as shown at 2 of FIGS. 1 and 5, or small workpieces, such as shown at 3 of FIGS. 1 and 5. These workpieces are, respectively, gripped either eccentrically or diametrically. Burrs which arose upon cutting are thereby not deformed so that they would not be removed by subsequent treating by the brushes 32. Usually, the burrs arise at the position where the cut-off saw leaves the cross section of the material. The machine, thus, can be so placed that the alignment jaw 5 is at the side where the saw had originally entered the cut-off material, so that the transfer jaws 17, 18 will grip remote from the burr. Forming the jaws 17, 18 with a small recess or depression 17', 18' adjacent the lower ends prevents deformation of burrs of small workpieces.

The clamping path of the transfer jaws 17, 18 should be long enough to grip any workpieces at ends thereof, for which the machine is designed, regardless of their length, within design dimensions. For reliable transfer to the transfer jaws, it is desirable that the axially fixed jaw 17 of the clamping jaw 17, 18 be not entirely or irremovably fixed but after aligning of the workpiece thereagainst, can move backwardly, away from the workpiece, by a small distance, for example a short stroke. This is not to be construed, however, as an adjustment for size; size adjustability movement of the supply jaws should be done by the jaw 18, that is, the one remote from the transfer jaw 17.

The receiver elements 22, 23 are axially positionable to accept workpieces of various lengths. Thus, they can be shifted longitudinally on their pivot axis 21, to have respective spaces which correspond to the length of the workpiece to be received and to be fed to the gripping unit 25 and/or the conveyor 26. The spacing, in axial direction, of the receiver unit 22, 23 can correspond, generally, to the spacing of the transfer jaws 17, 18—considering operating clearances. The walls of the machine frame are movable, parallel to the feed direction of the receiving conveyor 1. The wall closest to the severing or cutting machine may be fixed or movable—in the feed direction of the conveyor 1—only from time to time to accomodate large variations in length of workpieces; the other wall, for example wall 12, can be located for longitudinal shifting to match sequential workpieces. The walls, with an coupled spring element, then can guide the transfer jaws 17, 18. Providing shiftable walls ensures that the respective workpieces will have predetermined positions within the transfer jaws 17, 18, the receiver 21, 22, 23, and the gripping unit 25.

Providing movable walls also permits placement of end-working units, such as the brushes 32 on one or both walls 11, 12, which are rotated by a suitable motor drive to remove burrs. Since the spacing of the walls is matched to the workpieces, and the brushes move with the walls, the brushes, automatically, will assume appropriate positions to remove burrs from the end faces. To prevent shifting of a workpiece on the receiver 22, 23, while the brushes 32 act on the end faces, a resilient hold-down or engagement element can be associated with the receiver 22, 23 and/or the brush 32, engageable against the workpiece, to hold it in position. Such a resilient hold-down arm is not shown in the drawings since it can be placed in any suitable position on the respective projecting elements 22, 23 adjacent the opening 24 of the receiver, in accordance with well known engineering practice. The pivoting movement of the receiver 22, 23 can be uninterrupted, past the brushes 32, or interrupted for longer engagement with the brushes 32.

The walls 11, 12 can be controlled, additionally, by resilient pressure elements 11', 12', which may be particularly important for short workpieces when the transfer jaws may almost engage against each other. For longer workpieces they ensure a certain minimum spacing between the walls 11, 12 and the jaws 17, 18, which ensures reliable gripping of even such longer workpieces.

The construction of the transfer jaws and of the gripping jaws, respectively, is preferably such that, transversely to the longitudinal direction of the workpieces, they are narrow, so that the respective jaws can also grip small workpieces, that is workpieces of small cross section as shown schematically by workpiece 3. This ensures that also small workpieces, at the lowest design limit, can be reliably gripped and handled.

The gripping system 25, by virtue of its adjustability up-down, right-left and rotatable about axis 28, permits not only reliable positioning of workpieces but, for example, re-positioning of a cut-off disk of substantial diameter to lay it flat on the removal conveyor 26. The removal conveyor 26 can be a continuous conveyor; additionally, however, since the gripping system 25 with its jaws 29, 30 places the workpiece on the conveyor, the workpieces can be placed in single-piece carriers, such as single-piece pallets. Single-piece handling permits, for example, transport of such workpieces for further handling or treatment, for example for washing, removal of cutting fluid and the like, and subsequent machining. Additionally, placement of large-diameter disks, flat, on a conveyor in this manner permits shifting transversely to the conveyor direction by subsequent transfer apparatus, for example pushers and the like, for selective handling by subsequent machine tool units.

Suitable pallets on which the individual workpieces are positioned by the gripping unit 25 may be formed of non-magnetic material, so that ferrous workpieces can be handled by subsequent magnet units. The pallets can be coded, and additional so constructed that they are rotatable in selected positions, so that, outside of the system in accordance with the present invention, the pallets, and hence the workpieces can be positioned in a predetermined alignment which was originally determined by the gripping unit 25. The pallets, of course, can be arranged to be indexed or rotated so that, external to the system of the present invention, a precise alignment of the pallet and hence of the workpiece with respect to external apparatus can be obtained. Of course, the carriers or pallets for the workpiece can be so arranged that a stamp or punch can engage from the bottom to lift the workpieces for machining at the edges thereof. This is particularly important if the workpieces are non-circular so that a predetermined orientation is important. The arrangement, and particularly the gripping system 25, permits presenting the workpieces for subsequent handling to subsequent apparatus in such a manner that re-orientation or initial precise orientation for handling by subsequent clamping apparatus need not be specially considered.

The conveyor 1 need not be a moving conveyor but merely provide a predetermined path or delivery track for workpieces delivered from the severing or cutting machine. Conveying actually then is done by the conveyor jaws 4, 5 which, preferably, are so positioned that they engage the workpieces from above. The conveyor jaws are shiftable back-and-forth and already provide for an initially defined "ready" position of the workpieces which "ready" position is taken with reference to a predetermined direction, for example the feed direction of the conveyor path. This predetermined "ready" position is guaranteed by the conveyor jaw 5, which can reciprocate back-and-forth between the severing or cutting machine and the material handling system of the present invention. Transverse to that feeding direction, the conveyor jaw 5 forms a fixed engagement surface to permit orienting workpieces in accordance with the present invention.

The apparatus is suitable for long, as well as short workpieces; when used in connection with long workpieces, see FIGS. 18-24, it is difficult to grasp them by the transfer jaws at the end faces. Long workpieces arise, for example, in shaft elements and the like. If the workpieces exceed a certain length, readily determined by experimentation, the workpiece may be deformed, for example bowed or bent. Additionally, the danger may arise that the transfer jaws 17, 18 do not accurately meet the end face due to possible irregularities of the conveyor path 1. Thus, when handling long workpieces where gripping at the ends is undesirable—which can be readily be determined by observation or common sense—it is possible to still use the orientation system of the present invention by direct transfer to the receiver 22, 23; the transfer jaws 17, 18 then merely have guiding and, if desired, braking effect.

For long workpieces, the conveyor path 1 should, preferably, be a roller conveyor or the like which has, at least adjacent the system of the present invention, an arrangement to permit tilting or tipping of the roller conveyor by providing it with a tipping system 1" (FIG. 1), so that workpieces on the roller conveyor can be directly tipped into the receiver 22, 23. A transfer sheet 33, which can be used as a locating sheet for the long workpieces, can be used additionally to guide the workpieces as they are tipped into the receiver. The transfer jaws are then preferably placed in a position to be close to or adjacent a respective receiver element.

If a long workpiece is delivered over the conveyor 1, it can be readily introduced into the receiver by lateral ejection upon tipping of the conveyor, or conveyor section, as well known. The use of the transfer jaws, however, as guide surfaces and, if required as braking surfaces, ensures gentle transfer of even long cut sections, such as long shaft elements or the like, into the receivers, since the transfer jaws can form braking or engagement surfaces to prevent uncontrolled drop-off of heavy cut elements, such as an elongated shaft or other base workpiece, into the receiver.

The conveyor 1 preferably is made slidable in the direction of material feed and, as required, the conveyor jaws 4, 5 can then be introduced for feeding workpieces from an external position within the working range of the transfer jaws of the system of the present application.

The system, by being secured on a unitary frame 13, and preferable movable on wheels 14 and on the track 15, permits versatile application; thus, if a severing or cutting device is directly coupled to a machine tool, which then provides partly machined workpieces on a delivery path corresponding to the receiving conveyor 1. The system can be placed intermediate of machine tools for re-orienting workpieces at a high operating or clock rate. Alternatively, the unitary system can be removed to provide space at the end of the conveyor path 1 for other machine units. The portability of the system in accordance with the present invention also permits retrofitting existing workpiece handling installations where, previously, workpieces had to be manually placed, after severing, into predetermined positions to be able to handle them subsequent to severing by automatic production machinery.

Various changes and modifications may be made and any features described herein may be used with any of the others, within the scope of the inventive concept.

We claim:

1. A system for handling workpieces (2, 3) of bolt, rod or disk shape after severing of a workpiece of a selected length from rod, rail or stock material, whereby said workpiece will define two cross-sectional, or end regions, and an axially extending stem portion and wherein the length of individual workpieces may differ, wherein said workpiece is supplied to said system by a supply means (1, 4, 5, 6), said system comprising
a frame (10);
two oppositely associated transfer jaws (17, 18) which can move relative to each other selectively in accordance with the length of the workpiece between open and closed positions, and located to permit engagement of a workpiece (2, 3) supplied by said supply means, at the cross-sectional, or end regions of the workpiece,
said transfer jaws (17, 18) being pivotable about an axis (20) essentially parallel to the workpiece stem portion;
a workpiece receiver (22, 23) having two projecting portions and defining an opening (24, 24') between said portions, shaped to have essentially prismatic configuration to receive the stem portion of the workpiece therein,
said workpiece receiver being pivotable about an axis (21) essentially parallel to said workpiece stem portion,
said transfer jaws having a pivoting range which overlaps a pivoting range of the workpiece receiver for transfer of workpieces from the transfer jaws (17, 18), upon movement to open position, to the workpiece receiver (22, 23); and
movable workpiece gripping means (25) including two gripping jaws (29, 30), movably retained on said frame (10) for movement essentially parallel to said workpiece stem portion and additionally movable between a gripping position for selectively gripping the workpiece (2, 3) on the workpiece receiver and releasing the workpiece at a delivery position said delivery portion to said delivery position.

2. The system of claim 1, wherein said movable workpiece gripping means is pivotable about an axis (28) which is essentially horizontal and transverse to the workpiece axis.

3. The system of claim 1, wherein said two gripping jaws (29, 30) of the workpiece gripping means (25) are positioned for selectively holding the end regions of the workpiece in an axial grip.

4. The system of claim 1, wherein the pivot axis (21) of the workpiece receiver (22, 23) is located in a plane below the plane of the supply means (1, 4, 5, 6).

5. The system of claim 1,
wherein said transfer jaws (17, 18) are positioned for gripping the workpiece in an axial grip at said end regions.

6. The system of claim 5, wherein the transfer jaws define lower edges, and are formed with facing recesses (17', 18') adjacent said lower edge for gripping small workpieces.

7. The system of claim 1, wherein said transfer jaws are movable towards and away with respect to each other;
and wherein one (17) of said transfer jaws has a short movement stroke to permit release of a workpiece from between the transfer jaws, and the other (18) of the transfer jaws has an adjustable long movement stroke to provide for engagement of the other jaw against an end region of workpieces of different lengths.

8. The system of claim 1, wherein said receiver (22, 23) comprises receiver elements selectively positionable along said workpiece stem portion for reliably receiving workpieces of respectively different lengths.

9. The system of claim 7, wherein said receiver (22, 23) comprises receiver elements selectively positionable along said workpiece stem portion for reliably receiving workpieces of respectively different lengths and operatively corresponding to the spacing of said transfer jaws, said receiver elements being positionable on said pivot axis (21) about which the receiver is pivotable.

10. The system of claim 1, further including two essentially parallel wall elements (11, 12) extending essentially transversely to said workpiece axis, and movable relative to each other in a direction parallel to said workpiece stem portion;

and wherein said receiver includes receiver elements (22, 23), located inwardly of said wall elements (11, 12), and shiftable along said axis (21) about which the receiver is pivotable jointly with shifting of said wall elements.

11. The system of claim 10, wherein said receiver elements are resiliently retained with respect to said axis (21).

12. The system of claim 1, further including workpiece treatment means (32) positioned in the pivoting path of the workpiece receiver and located for engagement against end surfaces of a workpiece on the receiver for treatment of the end surfaces, optionally including removing burrs therefrom.

13. The system of claim 10, further including workpiece treatment means (32) positioned in the pivoting path of the workpiece receiver and located for engagement against end surfaces of a workpiece on the receiver for treatment of the end surfaces, and optionally removing burrs therefrom, said workpiece treatment means being secured to said wall elements (11, 12).

14. The system of claim 1, wherein said transfer jaws (17, 18) and said gripping jaws (29, 30) are narrow with respect to the maximum design dimension of workpieces for which the system is designed, relative to a direction transverse to said workpiece axis.

15. The system of claim 1, in combination with said supply means (1, 4, 5, 6), wherein said supply means includes a pair of supply or transport jaws (4, 5), said transport jaws being movable in a transport direction parallel to said workpiece axis, and openable with respect to each other in the direction of said workpiece axis;

and wherein one (5) of said transport jaws is located in a fixed position with respect to said transfer jaws (17, 18) to define a "ready" position of a workpiece on said supply means.

16. The system of claim 1, in combination with said supply means (1, 4, 5, 6);

and wherein said supply means includes a conveyor means (1), and means (1") for tipping or tilting said conveyor about a longitudinal axis parallel to said workpiece axis in a direction towards said workpiece receiver (22, 23) for direct transfer of workpieces from the conveyer to the receiver; and a guide element (33) is provided, coupled to said conveyor and dimensioned to fit against one of the projecting portions of said workpiece receiver for direct transfer of workpieces thereto.

17. The system of claim 16, including means (CU) for controlling the position of the transfer jaws (17, 18) adjacent the respective receiver elements (22, 23) and the end regions of a workpiece being transferred from the supply conveyor (1) to the receiver for controlling transfer, by gravity, of a workpiece from the supply conveyor to the receiver.

18. The system of claim 1, wherein said frame, transfer jaws, workpiece receiver and gripping means comprise a unitary structure;

and wherein said unitary structure is movable with respect to said supply means (1, 4, 5, 6) as a unit at least transverse to said workpiece axis.

19. The system of claim 1, further including control means (CU) individually and separately controlling said transfer jaws (17, 18) to open and close;

pivoting movement of said transfer jaws;

pivoting movement of said workpiece receiver (22, 23) about the workpiece receiver axis (21);

and gripping movement of the gripping jaws (29, 30) of said workpiece gripping means (25) for gripping a workpiece, and moving the workpiece to the delivery position, and releasing the workpiece;

and wherein at least two workpieces are individually separately gripped by said transfer jaws (17, 18), received in said workpiece receiver (22, 23) and moved by said workpiece gripping means (25) to permit simultaneous handling of a plurality of workpieces by, respectively, said transfer jaws, said workpiece receiver and said gripping means (25).

20. The system of claim 3, further including control means (CU) individually and separately controlling said transfer jaws (17, 18) to open and close;

pivoting movement of said transfer jaws;

pivoting movement of said workpiece receiver (22, 23) about the workpiece receiver axis (21);

and gripping movement of the gripping jaws (29, 30) of said workpiece gripping means (25) for gripping a workpiece, and moving the workpiece to the delivery position, and releasing the workpiece;

and wherein at least two workpieces are individually, separately gripped by said transfer jaws (17, 18), received by said workpiece receiver (22, 23) and moved by said workpiece gripping means (25) to permit simultaneous handling of a plurality of workpieces by, respectively, said transfer jaws, said workpiece receiver and said gripping means (25).

21. The system of claim 1, wherein said supply means (1, 4, 5, 6) includes locating means (5) for locating a workpiece in a predetermined "ready" position.

22. The system of claim 1, wherein said transfer jaws (17, 18) are positioned for gripping the workpiece in an axial grip at said end regions.

* * * * *